US012563282B2

(12) United States Patent
Nakamura et al.

(10) Patent No.: US 12,563,282 B2
(45) Date of Patent: Feb. 24, 2026

(54) VEHICULAR CAMERA

(71) Applicant: Panasonic Automotive Systems Co., Ltd., Kanagawa (JP)

(72) Inventors: Ken Nakamura, Kanagawa (JP); Kazufumi Takeshita, Tokyo (JP)

(73) Assignee: Panasonic Automotive System Co., Ltd., Kanagawa (JP)

( * ) Notice: Subject to any disclaimer, the term of this patent is extended or adjusted under 35 U.S.C. 154(b) by 0 days.

(21) Appl. No.: 18/982,892

(22) Filed: Dec. 16, 2024

(65) Prior Publication Data

US 2025/0220288 A1     Jul. 3, 2025

(30) Foreign Application Priority Data

Dec. 30, 2023    (JP) ................................. 2023-215057

(51) Int. Cl.
  *H04N 23/54*       (2023.01)
  *G03B 30/00*       (2021.01)
  *H04N 23/51*       (2023.01)

(52) U.S. Cl.
  CPC ............. *H04N 23/54* (2023.01); *G03B 30/00* (2021.01); *H04N 23/51* (2023.01)

(58) Field of Classification Search
  None
  See application file for complete search history.

(56) References Cited

U.S. PATENT DOCUMENTS

| | | | | |
|---|---|---|---|---|
| 10,279,781 | B2 * | 5/2019 | Zurowski | ............... G03B 17/12 |
| 10,623,611 | B2 * | 4/2020 | Zurowski | ............. H05K 5/0026 |
| 12,328,491 | B1 * | 6/2025 | Sesti | ....................... B60R 11/04 |

| | | | | |
|---|---|---|---|---|
| 2015/0340816 | A1 * | 11/2015 | Abe | ........................ H01R 13/42 |
| | | | | 439/607.34 |
| 2018/0006407 | A1 * | 1/2018 | Sasaki | .................... H01R 24/40 |
| 2018/0288293 | A1 * | 10/2018 | Byrne | ...................... H04N 23/57 |
| 2019/0103716 | A1 * | 4/2019 | Yamazaki | ............ H01R 13/743 |
| 2019/0246021 | A1 * | 8/2019 | Lu | ........................... H04N 23/57 |
| 2021/0313746 | A1 * | 10/2021 | Kato | ................. H01R 13/6215 |
| 2021/0384680 | A1 * | 12/2021 | Yamazaki | ............ H01R 12/716 |
| 2024/0187718 | A1 * | 6/2024 | Nakamura | ............. H04N 23/54 |
| 2024/0214695 | A1 * | 6/2024 | Makita | ................... H04N 23/81 |

FOREIGN PATENT DOCUMENTS

| | | |
|---|---|---|
| JP | 2018006162 A | 1/2018 |
| JP | 2019067740 A | 4/2019 |

* cited by examiner

*Primary Examiner* — Gelek W Topgyal
(74) *Attorney, Agent, or Firm* — Seed Intellectual Property Group Law Group LLP

(57)                ABSTRACT

A vehicular camera includes a lens unit, a circuit board, an imaging element, a plurality of electronic components disposed on first and second surfaces of the circuit board, a circuit board connector connection portion disposed on the second surface of the circuit board, a housing including a second tubular portion that accommodates at least the circuit board and the imaging element, a metallic first planar member covering at least a part of the plurality of electronic components disposed on the second surface of the circuit board and electrically connected to the circuit of the circuit board, a connector including at least one terminal that extends across an inside and an outside of the housing, and a metallic tubular member that surrounds at least a part of the at least one terminal of the connector around the direction along the optical axis and has a tubular shape.

20 Claims, 16 Drawing Sheets

VEHICULAR CAMERA

TECHNICAL FIELD

The present disclosure relates to a vehicular camera.

BACKGROUND ART

With demands for improvements in vehicle safety, introduction of autonomous driving functions, and the like in recent years, development of vehicular cameras that are mounted on vehicles and capture the inside and outside of the vehicles have become active (for example, see Patent Literatures 1 and 2).

CITATION LIST

Patent Literature

Patent Literature 1: JP2019-067740A
Patent Literature 2: JP2018-006162A

SUMMARY OF INVENTION

Required levels relating to safety, automatic driving functions, and the like, which are required for vehicles, are improved, and further improvement in performance and the like are also required for vehicular cameras.

The present disclosure relates to a technique for providing a new vehicular camera.

The present disclosure provides a vehicular camera including a lens unit including a first tubular portion having a first tubular shape and at least one lens disposed inside the first tubular portion and on an optical axis; a circuit board including a first surface and a second surface opposite to the first surface; an imaging element disposed on the optical axis and on the first surface of the circuit board; a plurality of electronic components disposed on the first surface of the circuit board and the second surface of the circuit board; a circuit board connector connection portion disposed on the second surface of the circuit board and electrically connected to a circuit of the circuit board; a housing including a second tubular portion that accommodates at least the circuit board and the imaging element and has a second tubular shape along the optical axis, a first end portion disposed between the first tubular portion of the lens unit and the circuit board in a direction along the optical axis, and a second end portion opposite to the first end portion in the direction along the optical axis; a metallic first planar member that is disposed between the first end portion of the housing and the second end portion of the housing, covers at least a part of the plurality of electronic components disposed on the second surface of the circuit board, and is electrically connected to the circuit of the circuit board; a connector including at least one terminal that is disposed in the second end portion of the housing and extends across an inside and an outside of the housing in the direction along the optical axis; and a metallic tubular member that is disposed at the second end portion of the housing, extends across the inside and outside of the housing in the direction along the optical axis, surrounds at least a part of the at least one terminal of the connector around the direction along the optical axis, and has a tubular shape. The first planar member includes a first planar portion that is disposed to face the second surface of the circuit board, has a first shape in a plan view of the first planar member, and includes a first hole disposed to include a central portion of the first shape, and at least one wall portion extending from an end portion of the first shape of the first planar portion toward the lens unit. The tubular member is electrically connected to the first planar member in a state in which at least a part of an outer surface of the tubular member is held by the central portion including the first hole of the first shape of the first planar portion of the first planar member. The at least one terminal of the connector penetrates the first hole including the central portion of the first shape of the first planar portion of the first planar member. The connector includes a first end portion disposed inside the housing in the direction along the optical axis, and a second end portion that is opposite to the first end portion and disposed outside the housing in the direction along the optical axis. An end portion of the circuit board connector connection portion has a spherical concave portion, the first end portion of the at least one terminal of the connector has a spherical convex portion, and the convex portion of the first end portion of the at least one terminal of the connector is electrically connected to the concave portion of the end portion of the circuit board connector connection portion.

According to the present disclosure, the circuit board connector connection portion and the terminal of the connector can be electrically connected with a simple configuration, and manufacturing cost of the vehicular camera can be reduced. The metallic first planar member covers at least a part of a plurality of electronic components disposed on the second surface of the circuit board. Further, since the metallic tubular member surrounds the connector, noise can be shielded.

DESCRIPTION OF EMBODIMENTS

Hereinafter, embodiments that specifically disclose a vehicular camera according to the present disclosure will be described in detail with reference to the drawings as appropriate. However, unnecessarily detailed descriptions may be omitted. For example, detailed descriptions of already well-known matters and redundant descriptions of substantially the same configuration may be omitted. This is to avoid unnecessary redundancy of the following descriptions and to facilitate understanding of those skilled in the art. It should be noted that the accompanying drawings and the following description are provided for those skilled in the art to sufficiently understand the present disclosure, and are not intended to limit the subject matter described in the claims.

(Vehicle on which Vehicular Camera is Mounted)

Figure 1:
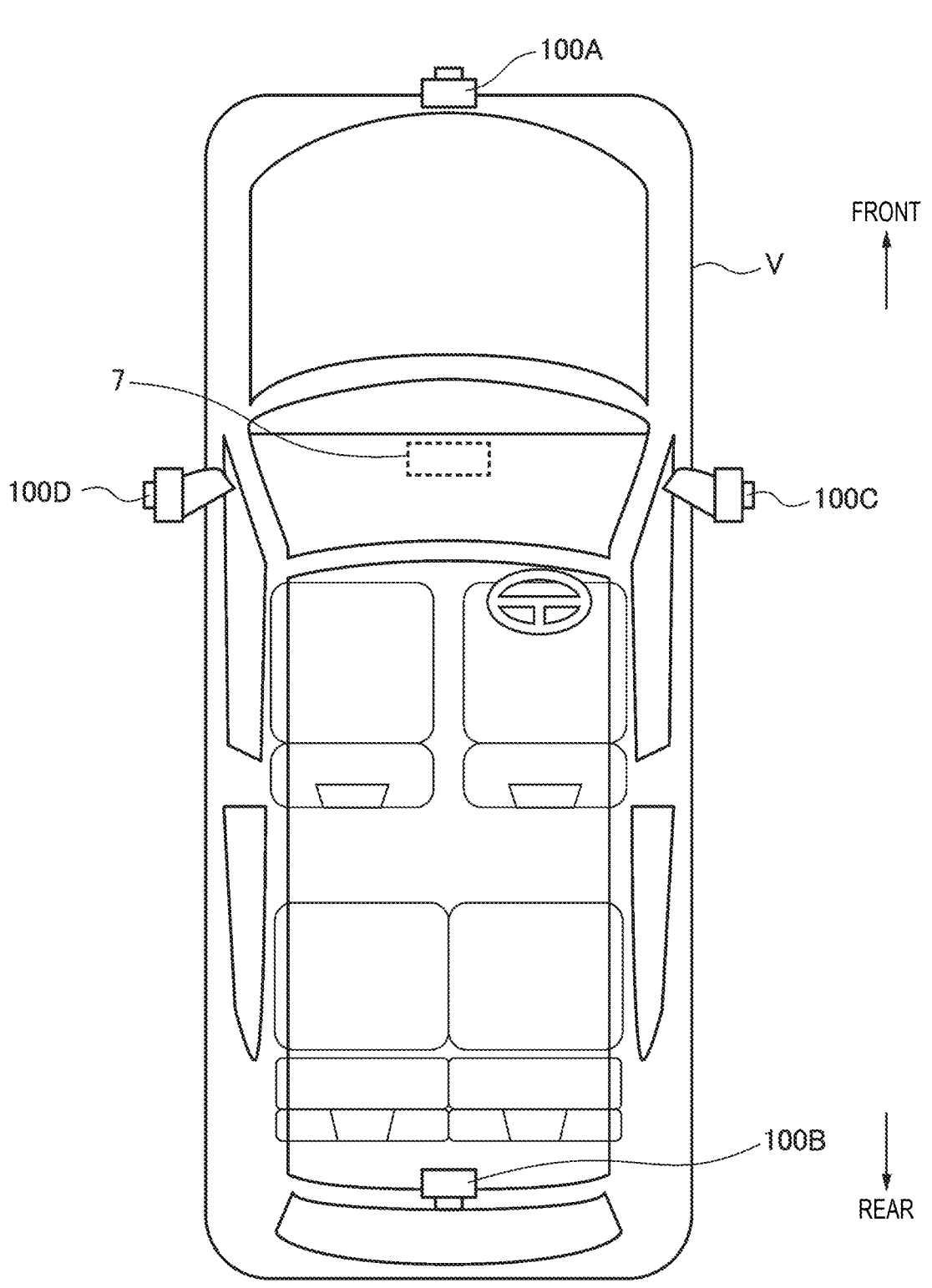
FIG. 1 is an example of a vehicle, and is a top view of the vehicle on which vehicular cameras are mounted.

FIG. 1 is an example of a vehicle, and is a top view of the vehicle on which vehicular cameras are mounted. As a vehicular camera 100, a vehicular camera 100A, a vehicular camera 100B, a vehicular camera 100C, and a vehicular camera 100D are mounted on a vehicle V. The vehicular camera 100A is a front camera, the vehicular camera 100B is a rear camera, the vehicular camera 100C is a right side camera, and the vehicular camera 100D is a left side camera. The vehicular cameras 100A to 100D are, for example, wide-angle cameras having an angle of view of about 180°, and are disposed to capture images showing an entire periphery of the vehicle V.

For example, the vehicular camera 100A is provided in a front grille of the vehicle V, and captures an image of a front region in a direction of looking down obliquely with respect to the ground. The vehicular camera 100B is provided in a roof spoiler of the vehicle V, and captures an image of a rear region in a direction of looking down obliquely with respect to the ground. The vehicular camera 100C and the vehicular camera 100D are provided in side mirrors of the vehicle V, and capture images of lateral regions in directions of looking down obliquely with respect to the ground, respectively.

Figure 2:
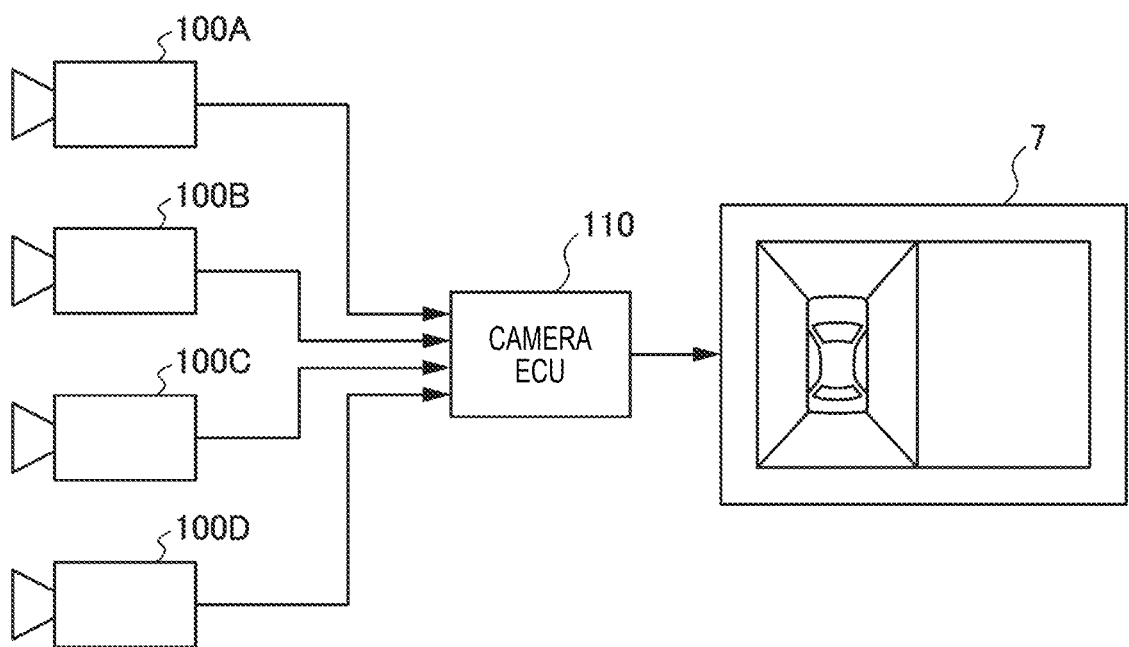
FIG. 2 is a block diagram illustrating a connection example of the vehicular cameras provided in the vehicle shown in FIG. 1, a camera ECU, and a display.

FIG. 2 is a block diagram illustrating a connection example of the vehicular cameras 100A to 100D provided in the vehicle V shown in FIG. 1, a camera ECU 110, and a display 7. The camera electronic control unit (ECU) 110 in FIG. 2 synthesizes the images captured by the vehicular cameras 100A to 100D, and displays a synthesized image on the display 7 of a navigation system disposed on an instrument panel, for example. An occupant can visually recognize the display 7 and check a situation around the vehicle V.

Figure 3:
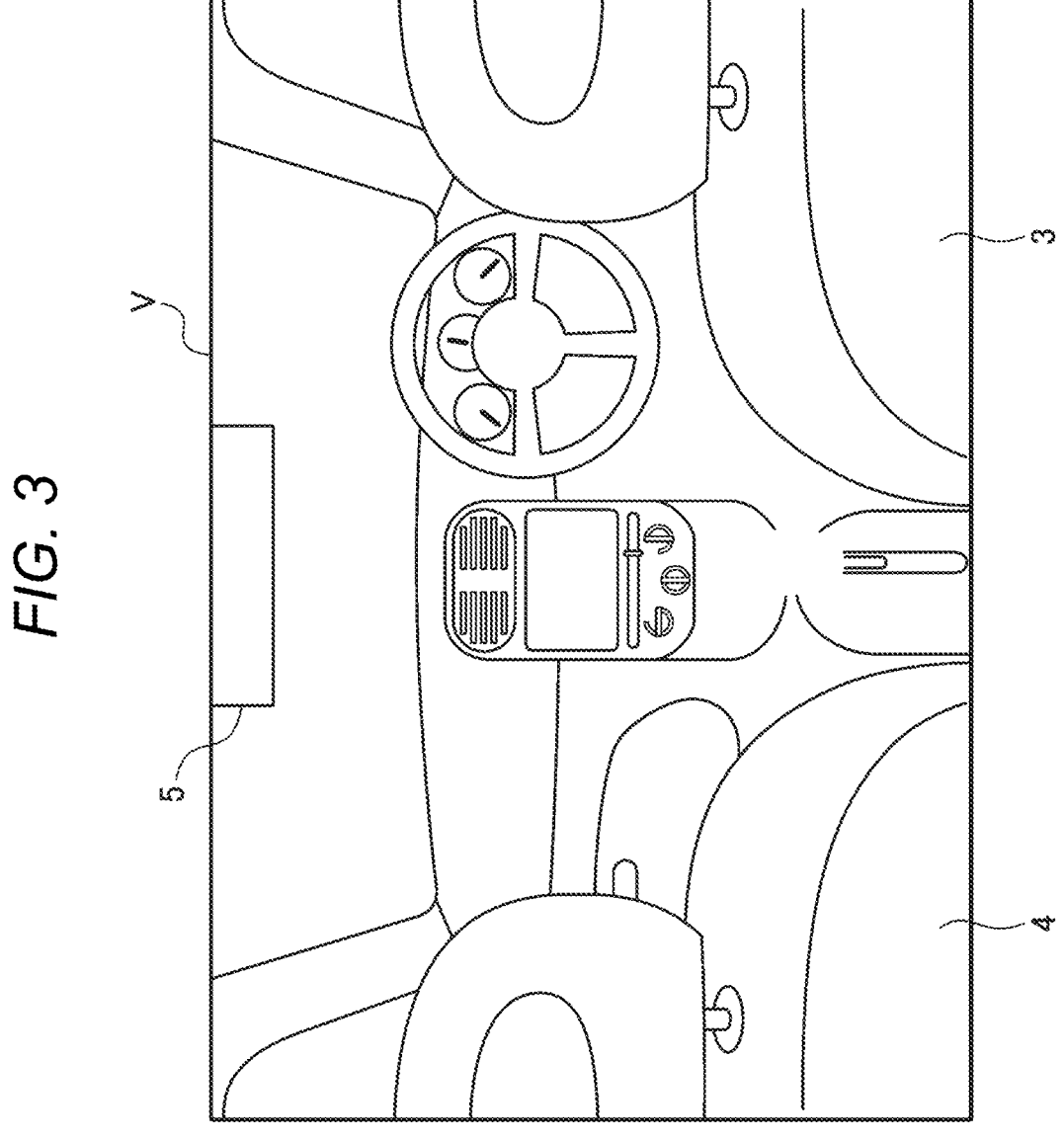
FIG. 3 is another example of the vehicle, and is a schematic diagram of a cabin of the vehicle on which a vehicular camera is mounted.
Figure 4:
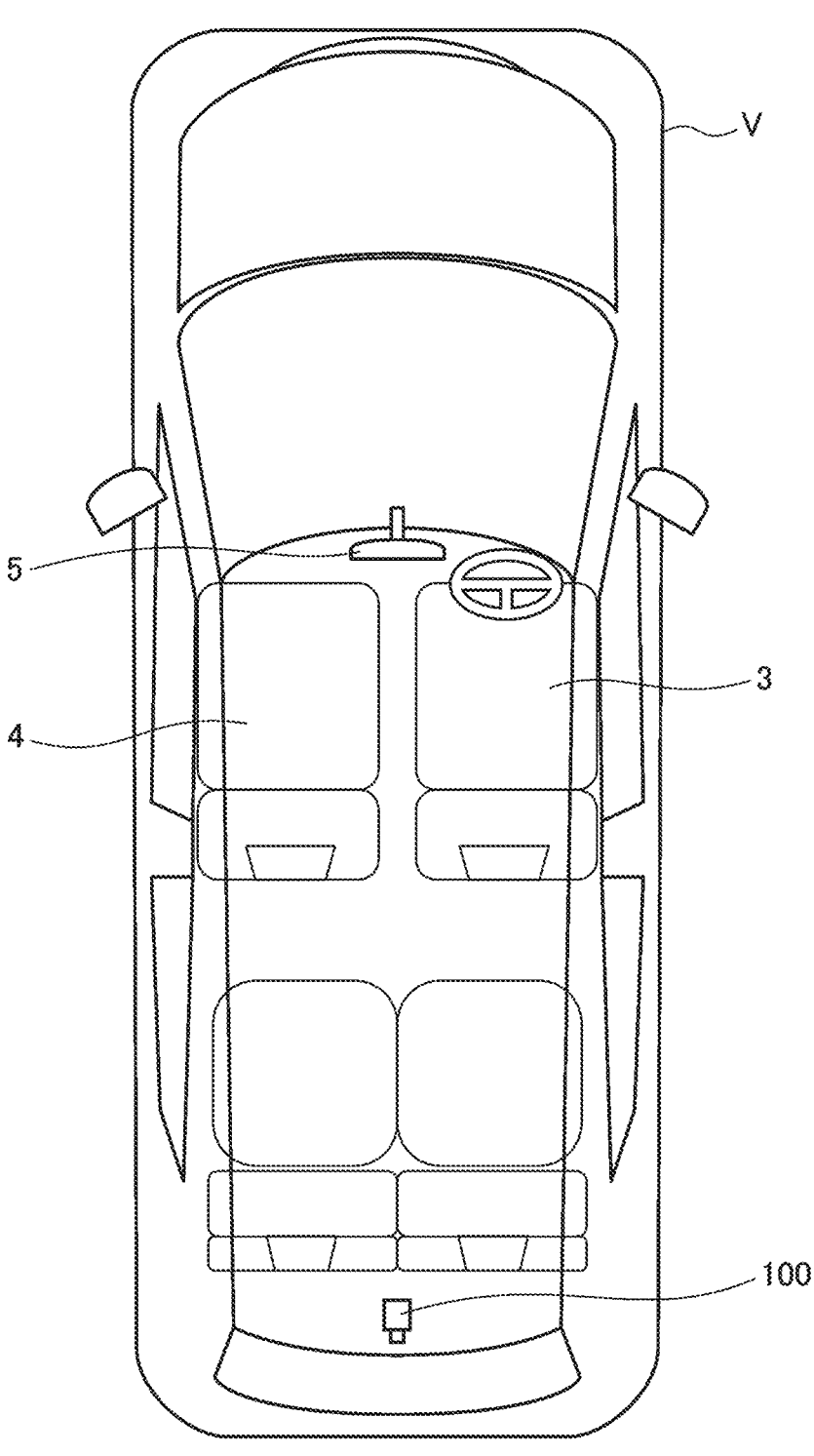
FIG. 4 is a top view of the vehicle in FIG. 3.
Figure 5:
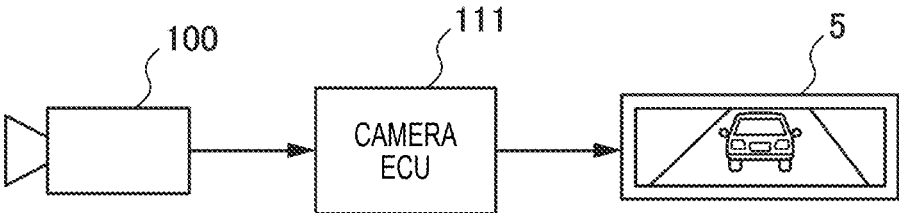
FIG. 5 is a block diagram illustrating a connection example of the vehicular camera provided in the vehicle shown in FIG. 3, a camera ECU, and a display device.

FIG. 3 is another example of the vehicle, and is a schematic diagram of a cabin of the vehicle on which the vehicular camera is mounted, and FIG. 4 is a top view of the vehicle in FIG. 3. The vehicle V includes a display device 5 (for example, an electronic rearview mirror) at an attachment position of a rearview mirror which is a front portion between a driver's seat 3 and a passenger seat 4 in a cabin 2. Further, the vehicle Vis provided with the vehicular camera 100 at a rear side of a vehicle body. FIG. 5 is a block diagram illustrating a connection example of the vehicular camera 100 provided in the vehicle V shown in FIG. 3, a camera ECU 111, and the display device 5. The camera electronic control unit (ECU) 111 in FIG. 4 processes an image captured by the vehicular camera 100, and the display device 5 displays the image. The occupant can visually recognize the display device 5 and check a rear situation of the vehicle V.

(Embodiment of Vehicular Camera)

Figure 6:
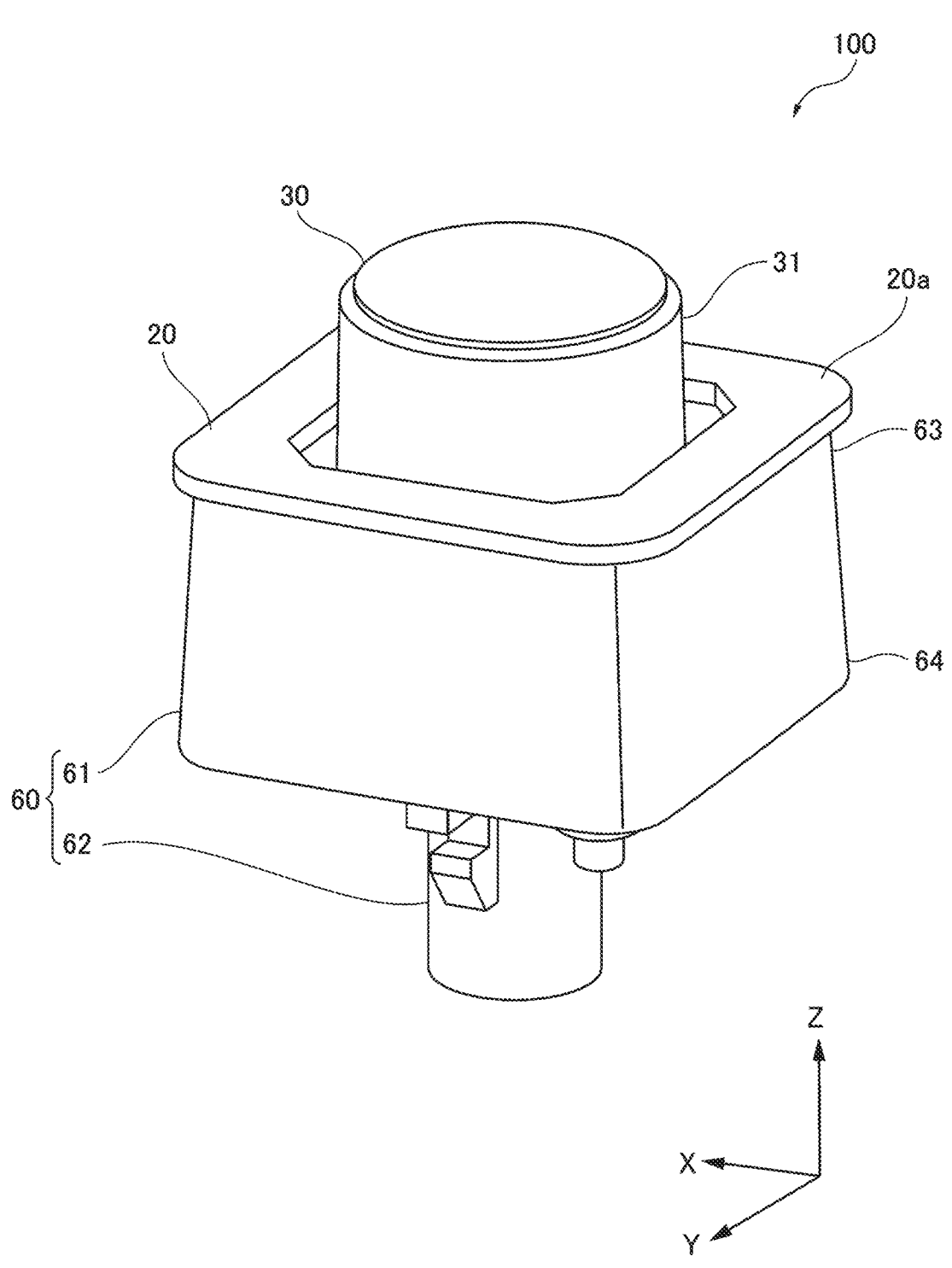
FIG. 6 is a front perspective view of the vehicular camera according to an embodiment.
Figure 7:
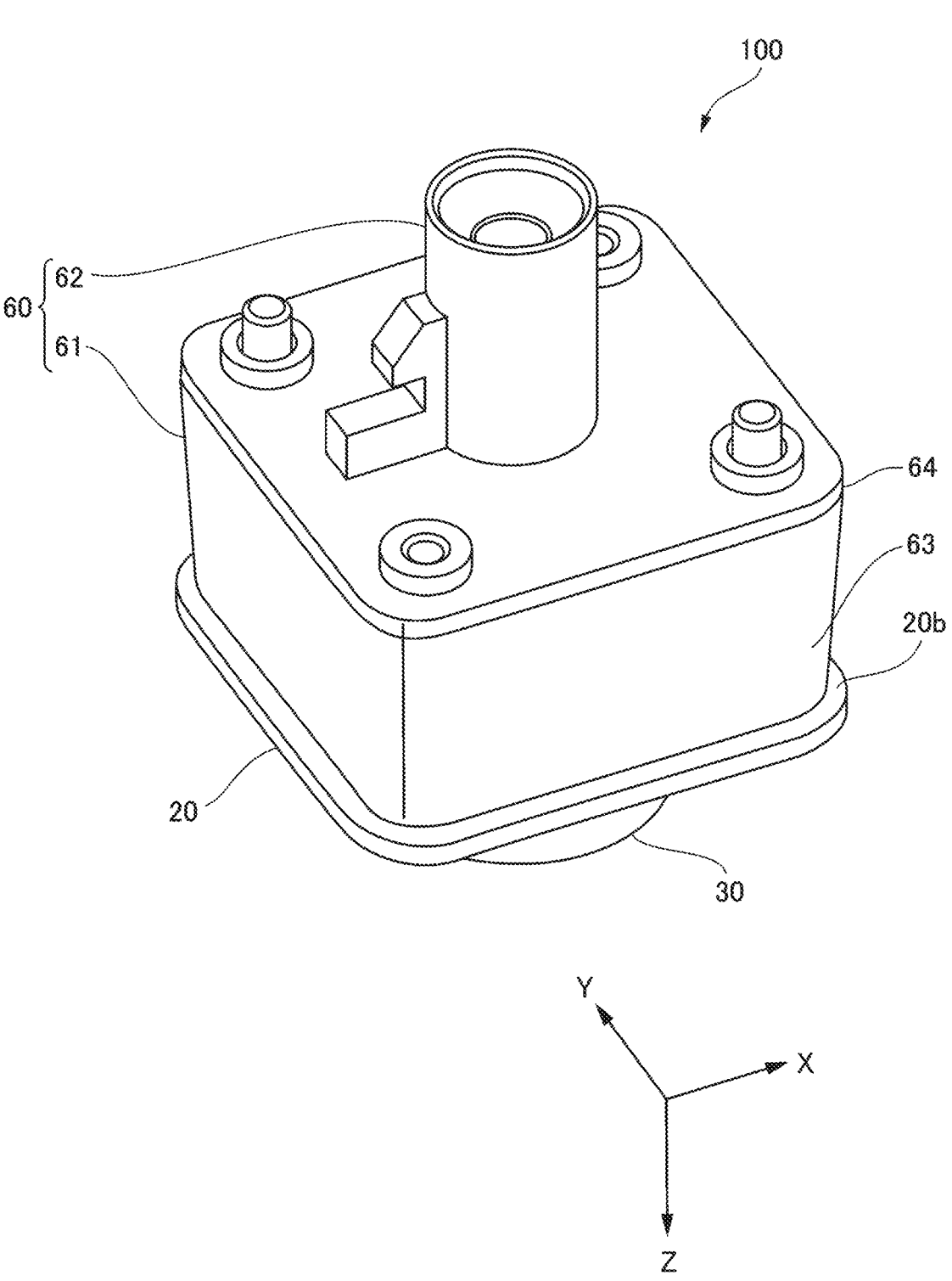
FIG. 7 is a rear perspective view of the vehicular camera according to the embodiment.
Figure 8:
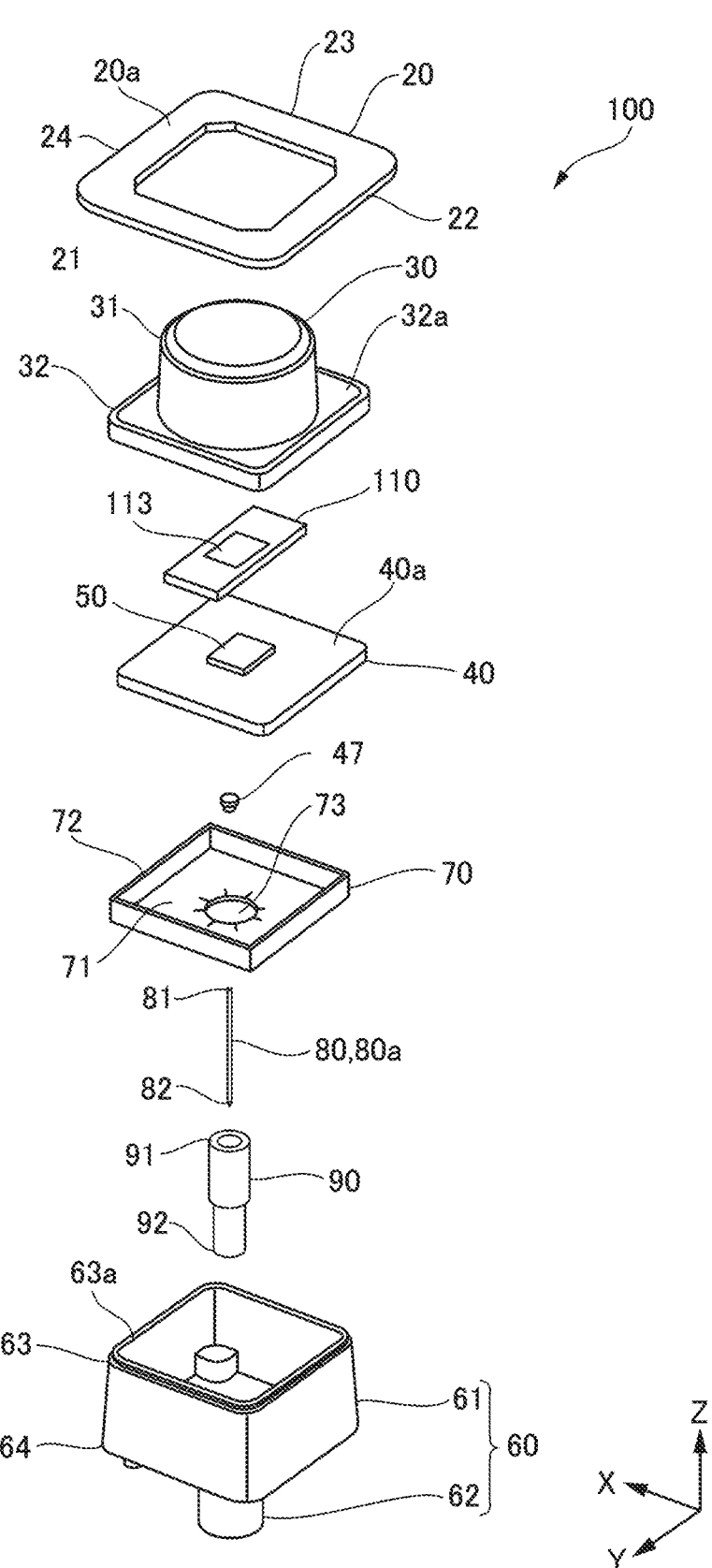
FIG. 8 is an exploded perspective view of the vehicular camera according to the embodiment.
Figure 9:
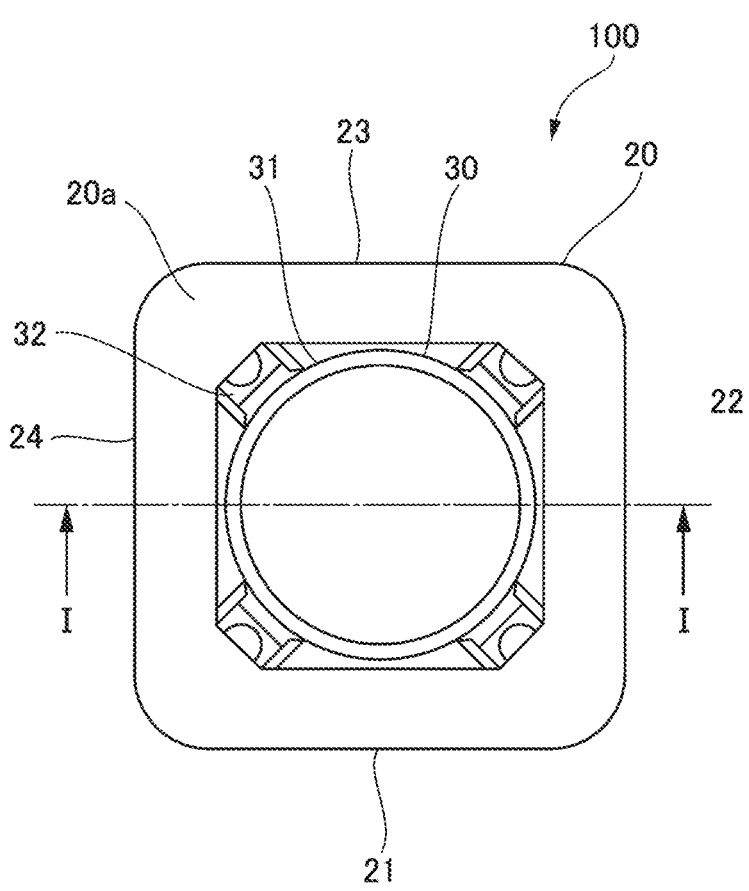
FIG. 9 is a top view of the vehicular camera according to the embodiment.
Figure 9:
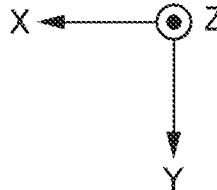
Figure 10:
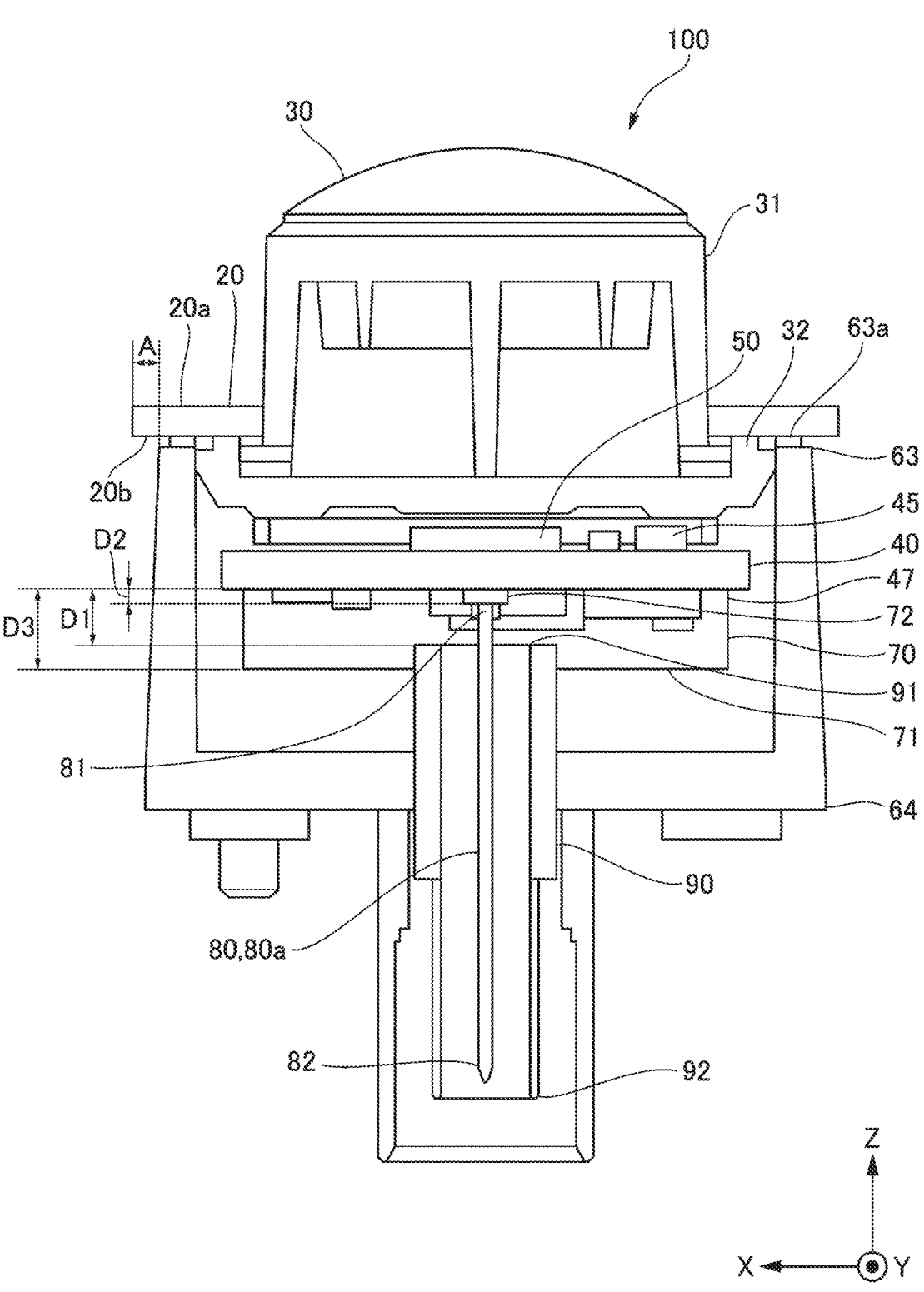
FIG. 10 is a cross-sectional view taken along a line I-I in FIG. 9.

FIG. 6 is a front perspective view of the vehicular camera 100 according to an embodiment. FIG. 7 is a rear perspective view of the vehicular camera 100 according to the embodiment. FIG. 8 is an exploded perspective view of the vehicular camera 100 according to the embodiment. FIG. 9 is a top view of the vehicular camera 100 according to the embodiment. FIG. 10 is a cross-sectional view taken along a line I-I in FIG. 9. Coordinates including an X axis along one side of the vehicular camera 100, a Y axis orthogonal to the X axis and along another side of the vehicular camera 100, and a Z axis orthogonal to the X axis and the Y axis and along a height direction of the vehicular camera 100 are defined, and are used in the following description.

The vehicular camera 100 according to the present embodiment includes a ring member 20, a lens unit 30, a circuit board 40, an imaging element 50, a housing 60, a first planar member 70, a connector 80, a tubular member 90, and a second planar member 110.

The ring member 20 is configured by a flat plate-shaped member including a first surface 20a and a second surface 20b opposite to the first surface 20a. The second surface 20b of the ring member 20 is welded to the lens unit 30 and the housing 60 by laser welding. An inner peripheral surface of the ring member 20 faces an outer peripheral surface of a first tubular portion 31 (to be described below) that constitutes a lens barrel of the lens unit 30. An inner diameter of the ring member 20 has a length that allows the first tubular portion 31 (to be described below) of the lens unit 30 to be inserted.

The ring member 20 can be formed of a first resin having predetermined light transmittance. Accordingly, the ring member 20 can be easily formed at low cost.

The lens unit 30 includes the first tubular portion 31 that constitutes a tubular lens barrel and has a first tubular shape, and at least one lens that is accommodated inside the first tubular portion 31 and arranged on an optical axis L (an axis extending in a direction perpendicular to a paper surface of FIG. 9 and along the Z axis). The first tubular portion 31 has a tubular shape, and holds therein, for example, a lens group including a plurality of lenses. The respective lenses in the lens group are arranged in a state in which respective optical axes L are aligned with each other, and constitute the lens group used for capturing images of the inside and outside of the vehicle body of the vehicle V.

Further, the lens unit 30 has a flange portion 32 disposed outside the first tubular portion 31 to extend outward with reference to the optical axis L over an entire circumference centering on the optical axis L. The flange portion 32 includes a first flange surface 32a facing at least a part of the second surface 20b of the ring member 20, and a second flange surface 32b opposite to the first flange surface 32a and facing at least a part of a first surface 40a (to be described later) of the circuit board 40.

At least the second flange surface 32b of the lens unit 30 can be formed of a second resin having a first light absorptivity. The lens unit 30 may be entirely formed of the second resin. Accordingly, the lens unit 30 can be easily formed at low cost.

The circuit board 40 is disposed in an internal space of the housing 60, particularly between the lens unit 30 and a second end portion 64 of the housing 60 to be described later in a direction along the optical axis L, and includes the first surface 40*a* and a second surface 40*b* opposite to the first surface 40*a*. However, two or more circuit boards may be provided.

A circuit board connector connection portion 47 is disposed on the second surface 40*b* of the circuit board 40 and electrically connected to a circuit of the circuit board 40. The circuit is disposed on each of the first surface 40*a* and the second surface 40*b* of the circuit board 40. The circuit disposed on the first surface 40*a* of the circuit board 40 and the circuit disposed on the second surface 40*b* of the circuit board 40 are electrically connected to each other. Further, a plurality of electronic components 45 are disposed on the first surface 40*a* of the circuit board 40 and the second surface 40*b* of the circuit board 40.

The imaging element 50 is disposed on the first surface 40*a* of the circuit board 40 and on the optical axis L of at least one lens of the lens unit 30. The imaging element 50 is electrically connected to the circuit of the circuit board 40, and can capture an image by directing external light to the imaging element 50. The imaging element 50 may be, for example, a complementary meta-oxide-semiconductor (CMOS) image sensor.

The housing 60 is a tubular member having the internal space, and serves to accommodate at least the circuit board 40 and the imaging element 50. The housing 60 includes a large-diameter tubular portion 61 having a second tubular shape along the optical axis L, a first end portion 63, and the second end portion 64. The first end portion 63 is disposed between the first tubular portion 31 of the lens unit 30 and the circuit board 40 in the direction along the optical axis L, and the second end portion 64 is opposite to the first end portion 63 in the direction along the optical axis L. Here, the direction along the optical axis L may include a direction inclined at an angle of ±10 degrees relative to the optical axis L.

The housing 60 further includes a small-diameter tubular portion 62 that is formed continuously with the second end portion 64, protrudes in a direction away from the circuit board 40 in the direction along the optical axis L, and has a diameter smaller than a diameter of the large-diameter tubular portion 61. The large-diameter tubular portion 61 constitutes a second tubular portion, and the small-diameter tubular portion 62 constitutes a third tubular portion.

The large-diameter tubular portion 61 and the small-diameter tubular portion 62 may be integrally formed, and the large-diameter tubular portion 61 and the small-diameter tubular portion 62 prepared individually in advance may be bonded by a method such as welding or screwing. In the present embodiment, the housing 60 has a rectangular tubular shape, but is not limited thereto, and may have a polygonal tubular shape other than the rectangular tubular shape, a circular or elliptical tubular shape, or another tubular shape.

The connector 80 includes at least one terminal 80*a* that is disposed at the second end portion 64 of the housing 60 and extends across an inside and an outside of the housing 60 in the direction along the optical axis L. The terminal 80*a* of the connector 80 is electrically connected to the circuit board connector connection portion 47 of the circuit board 40.

In a state in which the housing 60 accommodates at least the circuit board 40 and the imaging element 50, the ring member 20 is welded to the flange portion 32 of the lens unit 30 on a radially inner side, and is welded to the first end portion 63 of the housing 60 on a radially outer side over the entire circumference. The welding is performed by, for example, laser welding.

General laser welding is used for welding, for example, a first resin having a predetermined light transmittance and a second resin or a third resin having a light transmittance lower than the light transmittance of the first resin at a wavelength of laser light. When the first resin is irradiated with the laser light in a state in which pressure is applied to both the resins, the laser light is not absorbed and passes through the first resin. The transmitted laser light is absorbed by a surface of the second resin or the third resin having a light transmittance lower than that of the first resin. The energy of the absorbed laser is converted into heat, and the surface of the second resin or the third resin is heated. Further, a surface of the first resin in contact with the surface of the second resin or the third resin is also heated due to heat conduction. Accordingly, the first resin and the second resin or the third resin are melted at a boundary surface therebetween. When the laser emission is stopped, the melted resin is solidified and both resins are welded.

The ring member 20 is formed of the first resin, and at least the second flange surface 32*b* of the flange portion 32 of the lens unit 30 is formed of the second resin having the first light absorptivity. An end surface 63*a* of the first end portion 63 of the housing 60 is formed of the third resin having a second light absorptivity.

In the laser welding, first, in a state in which the second surface 20*b* of the ring member 20 is pressed against the first flange surface 32*a* of the flange portion 32 of the lens unit 30, the laser is emitted to weld the second surface 20*b* of the ring member 20 and the first flange surface 32*a*. Thereafter, in a state in which the second surface 20*b* of the ring member 20 is pressed against the end surface 63*a* of the first end portion 63 of the housing 60, the laser is emitted to weld the second surface 20*b* of the ring member 20 and the first end portion 63. Before welding, four protrusions 33 (see FIG. 13) of the lens unit 30 are fixed to the first surface 40*a* of the circuit board 40 via an adhesive, and the lens unit 30 and the circuit board 40 are integrated. After the laser welding is completed, the connector 80 is inserted into the inside of the housing 60 and connected to the circuit board 40.

An assembly error inevitably occurs in the welding including the laser welding, and a position and a posture of the circuit board 40 integrated with the lens unit 30 do not match an ideal design in all products. For this reason, even if the connector 80 is inserted into the inside of the housing 60 after welding, the circuit board 40 is not necessarily disposed at a position and a posture matching the design, and thus the connector 80 may not be connected to the circuit board 40 as designed, and a problem may occur in the conduction of electrical signals.

In order to cope with such a problem, a method of absorbing an assembly error of the circuit board 40 by adopting a connector having a floating structure including a spring capable of absorbing the assembly error as the connector 80 has been adopted in the related art. However, the connector having such a floating structure has a complicated structure and causes an increase in cost of the vehicular camera 100.

In view of the above situation, in the present embodiment, the connection between the circuit board 40 and the connector 80 is simplified. That is, the connector 80 includes a first end portion 81 disposed inside the housing 60 in the direction along the optical axis L, and a second end portion 82 that is opposite to the first end portion 81 and disposed outside the housing 60 in the direction along the optical axis L. The first end portion 81 has a spherical convex portion. An end portion of the circuit board connector connection portion 47 provided on the circuit board 40 has a spherical concave portion. The convex portion of the first end portion 81 of at least one terminal 80a of the connector 80 can be electrically connected to the concave portion of the end portion of the circuit board connector connection portion 47.

With the above configuration, in the laser welding of the present embodiment, the second surface 20b of the ring member 20 and the first flange surface 32a of the flange portion 32 of the lens unit 30 integrated with the circuit board 40 are welded to form a module, and a portion of the ring member 20 of the module (the ring member 20, the lens unit 30, and the circuit board 40) is placed on the end surface 63a of the first end portion 63 of the housing 60. After the module is accurately aligned with the housing 60 while being shifted along an XY plane using a predetermined chart or the like, in a state in which the second surface 20b of the ring member 20 is pressed against the end surface 63a of the first end portion 63 of the housing 60, the laser is irradiated from the first surface 20a of the ring member 20 to weld the second surface 20b of the ring member 20 and the first end portion 63.

After the position and the posture of the circuit board 40 are adjusted through the above process, the connector 80 is inserted into the inside of the housing 60 and connected to the circuit board 40. In the present embodiment, the spherical convex portion of the first end portion 81 of the terminal 80a of the connector 80 is electrically connected to the spherical concave portion of the end portion of the circuit board connector connection portion 47 provided on the second surface 40b of the circuit board 40. The connection structure is a ball joint type connector.

The spherical convex portion of the first end portion 81 of the connector 80 and the spherical concave portion of the end portion of the circuit board connector connection portion 47 are spherical surfaces and are electrically connected to each other via a wide surface. Accordingly, the circuit board 40 and the connector 80 can be electrically connected with a simple configuration, and the manufacturing cost of the vehicular camera 100 can be reduced.

In the connector having the floating structure in the related art, even if the electrical connection between the circuit board and the connector is secured, a spring portion of the floating structure may be distorted. In such a state, smooth propagation of an electric signal between the circuit board and the connector may be hindered. In the present embodiment, a simple connection structure that does not employ a spring is adopted, thereby preventing the smooth propagation of an electric signal from being hindered.

Figure 11:
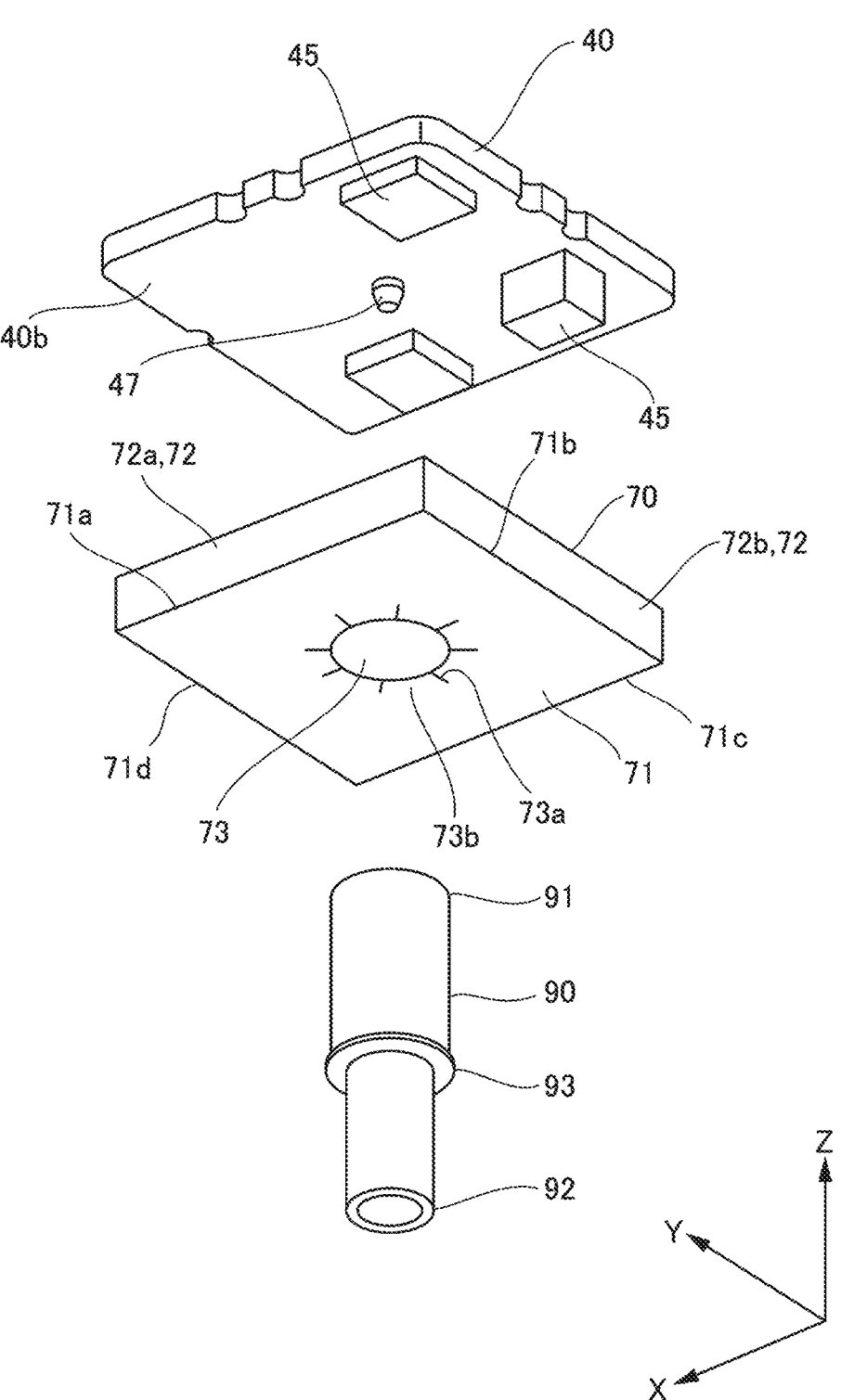
FIG. 11 is an exploded perspective view of a circuit board, a first planar member, and a tubular member as viewed from below.

FIG. 11 is an exploded perspective view of the circuit board 40, the first planar member 70, and the tubular member 90 as viewed from below. The vehicular camera 100 of the present embodiment further includes the first planar member 70 and the tubular member 90. The first planar member 70 is a metallic member that is disposed between the first end portion 63 of the housing 60 and the second end portion 64 of the housing 60, covers at least a part of the plurality of electronic components 45 disposed on the second surface 40b of the circuit board 40, and is electrically connected to the circuit of the circuit board 40.

The first planar member 70 includes a first planar portion 71 and at least one wall portion 72.

The first planar portion 71 is disposed to face the second surface 40b of the circuit board 40, has a first shape in a plan view (viewed from the direction along the optical axis L, the same applies hereinafter) of the first planar member 70, and includes a first hole 73 disposed to include a central portion of the first shape. The wall portion 72 extends from an end portion of the first shape of the first planar portion 71 toward the lens unit 30. The first planar member 70 has the first hole 73 including the central portion of the first planar portion 71, but may cover at least a part of the plurality of electronic components 45 except for the first hole 73. The first shape of the first planar portion 71 is, for example, a quadrilateral shape, but may be a triangular shape, a polygonal shape having pentagons or more sides, or a circular shape.

The tubular member 90 is a metallic member that is disposed at the second end portion 64 of the housing 60, extends across the inside and the outside of the housing 60 in the direction along the optical axis L, surrounds at least a part of at least one terminal 80a of the connector 80 around the direction along the optical axis L, and has a tubular shape. In FIG. 11, the connector 80 is not shown.

The tubular member 90 is electrically connected to the first planar member 70 in a state in which at least a part of an outer surface of the tubular member 90 is held by the central portion including the first hole 73 of the first shape of the first planar portion 71 of the first planar member 70. At least one terminal 80a of the connector 80 penetrates the first hole 73 including the central portion of the first shape of the first planar portion 71 of the first planar member 70. A packing 93 for preventing moisture penetration is provided on an outer circumferential surface of the tubular member 90.

According to the above configuration, the metallic first planar member 70 directly covers at least a part of the plurality of electronic components 45 disposed on the second surface of the circuit board 40, and the metallic tubular member 90 directly surrounds the connector 80. Accordingly, the first planar member 70 and the tubular member 90 can efficiently shield noise from the plurality of electronic components 45 and the connector 80. By connecting the wall portion 72 of the first planar member 70 to the ground of the circuit board 40, the first planar member 70 and the tubular member 90 function as the ground.

The tubular member 90 includes a first end portion 91 disposed inside the housing 60 in the direction along the optical axis L, and a second end portion 92 that is opposite to the first end portion 91 and disposed outside the housing 60 in the direction along the optical axis L. As shown in FIG. 10, in the direction along the optical axis L, a first distance D1 between the first end portion 91 of the tubular member 90 and the second surface 40b of the circuit board 40 is larger than a second distance D2 between the first end portion 81 of at least one terminal 80a of the connector 80 and the second surface 40b of the circuit board 40.

Accordingly, it is possible to prevent the first end portion 91 of the tubular member 90 from coming into contact with the circuit board 40 and causing conduction between tubular member 90 and the circuit board 40, and ensure the connection between the circuit board connector connection portion 47 provided on the second surface 40b of the circuit board 40 and the terminal 80a of the connector 80 without the tubular member 90 becoming an obstacle.

Furthermore, as shown in FIG. 10, in the direction along the optical axis L, the first distance D1 between the first end portion 91 of the tubular member 90 and the second surface 40b of the circuit board 40 is smaller than a third distance D3 between the first planar portion 71 of the first planar member 70 and the second surface 40b of the circuit board 40.

Accordingly, since the first planar member 70 covers the first end portion 91 of the tubular member 90, the shielding can be more reliably secured.

The first end portion 91 of the tubular member 90 is not connected to the circuit board connector connection portion 47. Accordingly, it is possible to prevent the conduction between the tubular member 90 and the circuit board 40.

In addition, there is a space between the first planar portion 71 of the first planar member 70 and the second end portion 64 of the housing 60, and there is a space between at least one wall portion 72 of the first planar member 70 and the large-diameter tubular portion 61 of the housing 60. Accordingly, the first planar member 70 can be easily disposed inside the housing 60.

Figure 12:
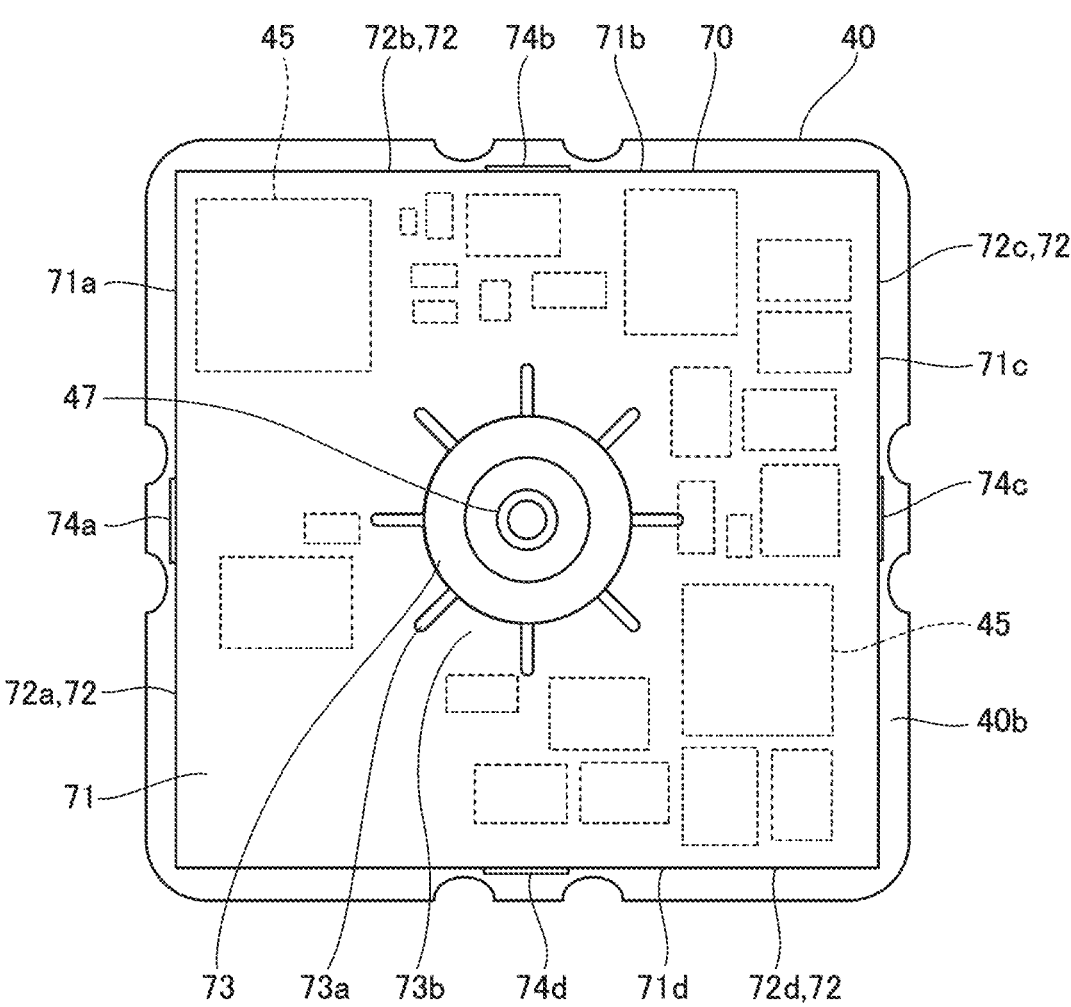
FIG. 12 is a plan view of the circuit board and the first planar member as viewed from a second surface of the circuit board.
Figure 12:
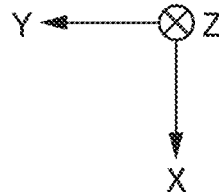

FIG. 12 is a plan view of the circuit board 40 and the first planar member 70 as viewed from the second surface 40b of the circuit board 40. A plurality of cuts 73a are formed along an entire circumference of the central portion including the first hole 73 of the first shape of the first planar portion 71 of the first planar member 70. Accordingly, the outer surface of the tubular member 90 can be easily attached to the first hole 73 of the first planar member 70.

Specifically, the tubular member 90 is electrically connected to the first planar member 70 in a state in which at least a part of the outer surface of the tubular member 90 is held by biasing force of a plurality of elastic pieces 73b defined by the plurality of cuts 73a in the central portion including the first hole of the first planar portion 71 of the first planar member 70.

Accordingly, the plurality of elastic pieces 73b can hold the outer surface of the tubular member 90 in the first hole 73 of the first planar member 70, and can ensure conduction between the first planar member 70 and the tubular member 90.

At least one terminal 80a of the connector 80 may be a metallic pin. The pin constituting the terminal 80a is electrically connected to a cable of the vehicle V, and transmits a signal or the like related to an image between the circuit of the circuit board 40 and the cable of the vehicle V. Accordingly, the configuration of the connector 80 can be simplified, and the cost can be reduced.

When the vehicular camera 100 is disposed in the vehicle V, the second end portion 82 of at least one terminal 80a of the connector 80 is electrically connected to the cable of the vehicle. Accordingly, an electric signal can be transmitted to and from the vehicle V.

As described above, the housing 60 includes the small-diameter tubular portion 62 that is formed continuously with the second end portion 64 of the housing 60, protrudes in a direction away from the circuit board 40 in the direction along the optical axis L, and has a diameter smaller than a diameter of the large-diameter tubular portion 61 of the housing 60. The second end portion 92 of the tubular member 90 is disposed inside the small-diameter tubular portion 62. Accordingly, the tubular member 90 can be stably disposed in the small-diameter tubular portion 62 having a small diameter.

The connector 80 may be integrated with the tubular member 90, and the connector 80 and the tubular member 90 may be integrally formed with the second end portion 64 and the small-diameter tubular portion 62 of the housing 60. For example, the connector 80 and the tubular member 90 are insert-molded with the second end portion 64 and the small-diameter tubular portion 62 of the housing 60. Accordingly, it is possible to easily assemble the connector 80, the tubular member 90, and the housing 60.

The relationship among the ring member 20, the lens unit 30, and the housing 60 will be described. As described above, the ring member 20 is formed of the first resin having predetermined light transmittance. The second flange surface 32b of the flange portion 32 of the lens unit 30 is formed of the second resin having the first light absorptivity. The end surface 63a of the first end portion 63 of the housing 60 is formed of the third resin having the second light absorptivity.

As shown in FIG. 10, the flange portion 32 of the lens unit 30 is disposed more inward than the large-diameter tubular portion 61 of the housing 60 in a radial direction orthogonal to the optical axis L. The ring member 20 protrudes outward in the radial direction from the first end portion 63 of the housing 60 over an entire circumference centered on the optical axis L.

The second surface 20b of the ring member 20 is welded to the first flange surface 32a of the flange portion 32 of the lens unit 30 and the end surface 63a of the first end portion 63 of the housing 60 by the laser irradiation from the first surface 20a of the ring member 20.

After first laser welding of the ring member 20 and the lens unit 30, the ring member 20 is placed on the first end portion 63 of the housing 60, and second laser welding of the ring member 20 and the housing 60 is performed. Here, the ring member 20 protrudes outward in the radial direction from the first end portion 63 of the housing 60 over the entire circumference, and thus in the second welding, the ring member 20 and the lens unit 30, which are welded to each other, can be accurately aligned while being shifted along the XY plane. Thus, assembly with high accuracy can be performed.

A protruding length A (see FIG. 10) of the ring member 20 protruding outward in the radial direction from the first end portion 63 of the housing 60 may vary according to the position around an entire circumference of the ring member 20. Accordingly, the second laser welding can be performed after the lens unit 30 and the ring member 20, which are welded to each other, are moved along the XY plane to a suitable position with respect to the housing 60, and the assembly with high accuracy can be performed.

In the embodiment, a cross section along the radial direction of the flange portion 32 of the lens unit 30 has a first quadrilateral shape, a cross section along the radial direction of the ring member 20 has a second quadrilateral shape, and a cross section along the radial direction of the second tubular portion of the housing 60 has a third quadrilateral shape. The ring member 20 has at least a first side 21, a second side 22, a third side 23, and a fourth side 24.

For example, a first protruding length of the first side 21 of the ring member 20 protruding outward in the radial direction from the first end portion 63 of the housing 60 may be different from a second protruding length of the second side 22 of the ring member 20 protruding outward in the radial direction from the first end portion 63 of the housing 60.

Accordingly, the vehicular camera 100 can be easily manufactured using a member having a common shape. In addition, the second laser welding can be performed after the lens unit 30 and the ring member 20, which are welded to each other, are moved along the XY plane to a suitable position with respect to the housing 60, and the assembly with high accuracy can be performed.

Figure 13:
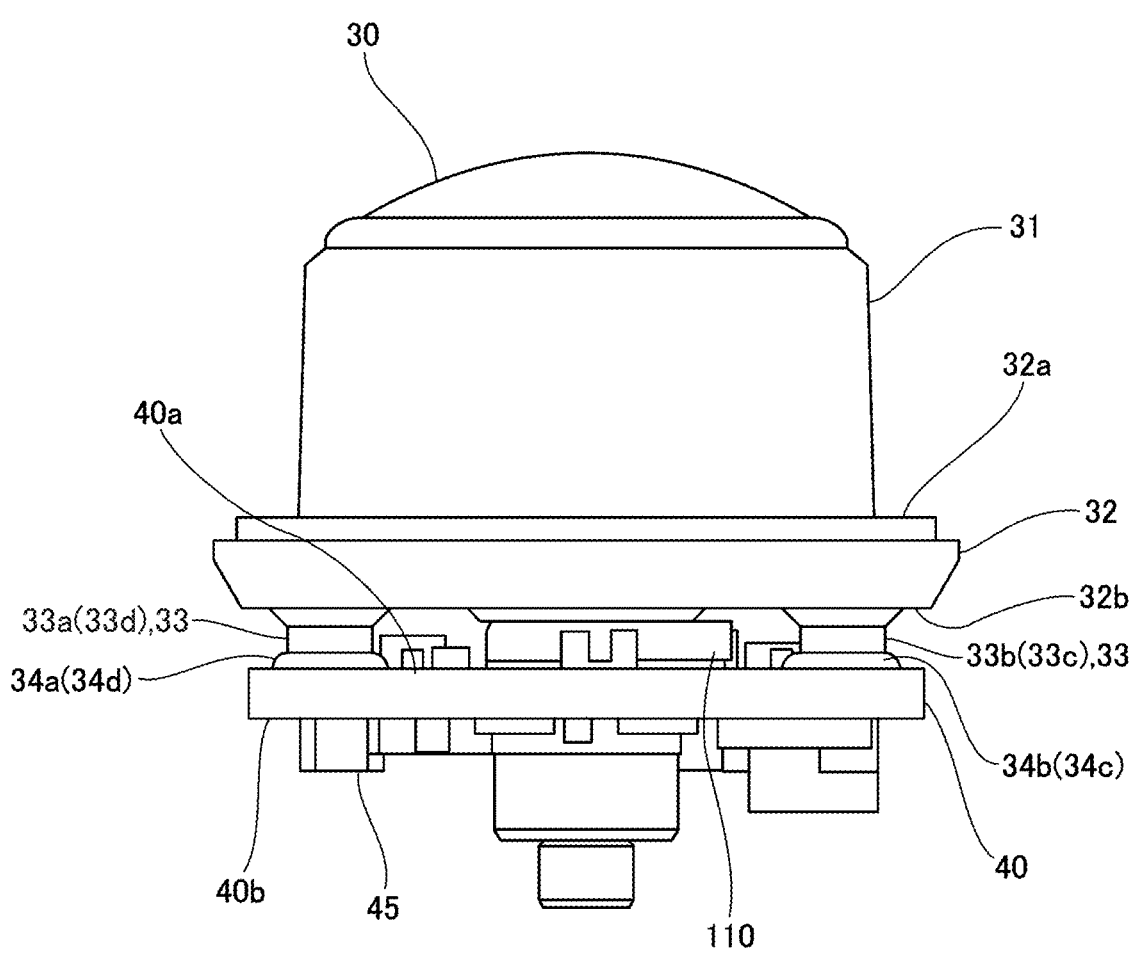
FIG. 13 is a side view showing a fixed state of a lens unit and the circuit board.
Figure 13:
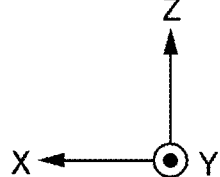

FIG. 13 is a side view showing a fixed state of the lens unit 30 and the circuit board 40. The lens unit 30 includes at least four protrusions 33 protruding from the second flange surface 32b of the flange portion 32 toward the first surface 40a of the circuit board 40. At least four protrusions 33 include a first protrusion 33a, a second protrusion 33b, a third protrusion 33c, and a fourth protrusion 33d. The first protrusion 33a is fixed to the first surface 40a of the circuit board 40 via a first adhesive 34a, the second protrusion 33b is fixed to the first surface 40a of the circuit board 40 via a second adhesive 34b, the third protrusion 33c is fixed to the first surface 40a of the circuit board 40 via a third adhesive 34c, and the fourth protrusion 33d is fixed to the first surface 40a of the circuit board 40 via a fourth adhesive 34d. In FIG. 13, the third protrusion 33c and the third adhesive 34c exist behind the second protrusion 33b the second adhesive 34b, and the fourth protrusion 33d and the fourth adhesive 34d exist behind the first protrusion 33a and the first adhesive 34a.

Accordingly, the circuit board 40 can be fixed to the lens unit 30 by the four protrusions 33, and the circuit board 40 can be stably disposed inside the housing 60. In addition, the ring member 20 is welded to the second flange surface 32b of the flange portion 32 in FIG. 13 by the first laser welding, and at the time of the second laser welding of the ring member 20 and the housing 60, the circuit board 40 is also moved along the XY plane together with the ring member 20 and the lens unit 30 to perform alignment, and then the second laser welding can be performed. Thus, the assembly with high accuracy can be performed.

In the embodiment, the first hole 73 including the central portion of the first planar portion 71 of the first planar member 70 has a circular shape, and the tubular member 90 has a tubular shape. Accordingly, the vehicular camera 100 can be easily manufactured using a member having a common shape.

As shown in FIG. 12, the first planar member 70 includes at least a fifth side 71a, a sixth side 71b, a seventh side 71c, and an eighth side 71d in a plan view of the first planar portion 71. The first planar member 70 further includes a first wall portion 72a extending toward the second surface 40b of the circuit board 40 correspondingly to the fifth side 71a of the first planar portion 71, a second wall portion 72b extending toward the second surface 40b of the circuit board 40 correspondingly to the sixth side 71b of the first planar portion 71, a third wall portion 72c extending toward the second surface 40b of the circuit board 40 correspondingly to the seventh side 71c of the first planar portion 71, and a fourth wall portion 72d extending toward the second surface 40b of the circuit board 40 correspondingly to the eighth side 71d of the first planar portion 71.

Accordingly, the vehicular camera 100 can be easily manufactured using the first planar member 70 having a common shape such as a box shape.

Figure 14:
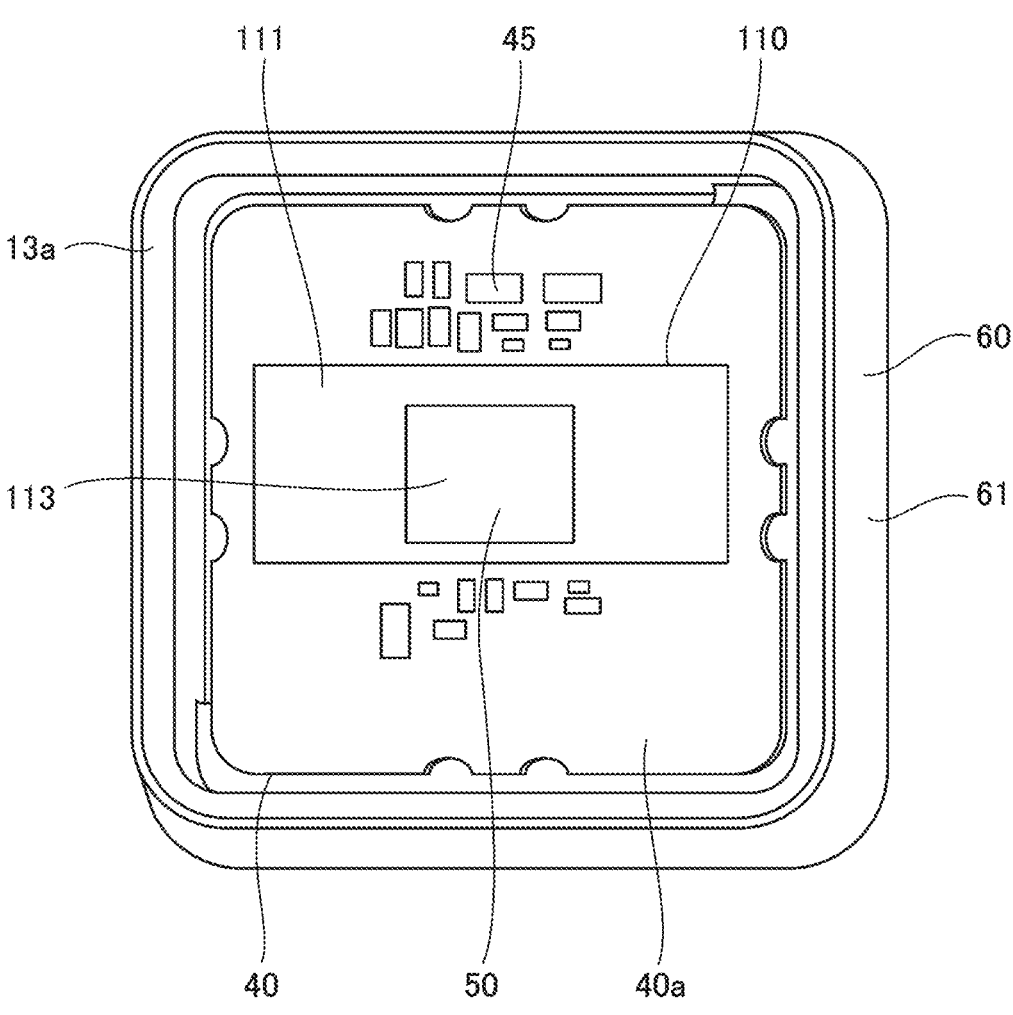
FIG. 14 is a perspective view of the circuit board and a housing as viewed from above.
Figure 14:
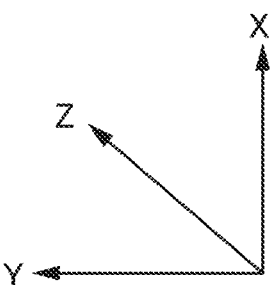
Figure 15:
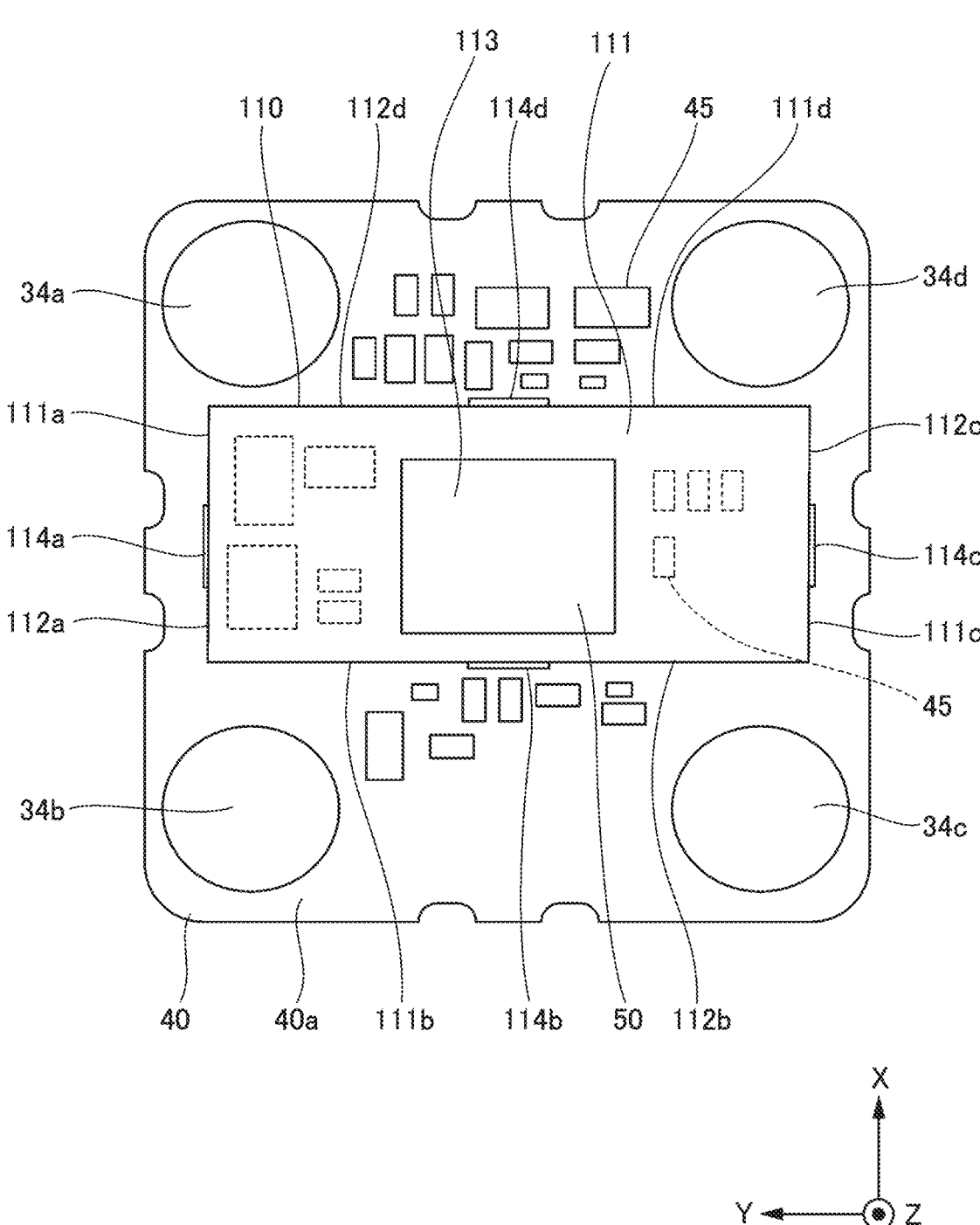
FIG. 15 is a plan view of the circuit board as viewed from a first surface.

FIG. 14 is a perspective view of the circuit board 40 and the housing 60 as viewed from above. FIG. 15 is a plan view of the circuit board 40 as viewed from the first surface 40a. The vehicular camera 100 further includes a second planar member 110. The second planar member 110 is a metallic member that is disposed on the first surface 40a of the circuit board 40 and is disposed to cover at least a part of the plurality of electronic components disposed on the first surface 40a of the circuit board 40 and the imaging element.

The second planar member 110 includes a second planar portion 111 having a second shape having at least a ninth side 111a, a tenth side 111b, an eleventh side 111c, and a twelfth side 111d in a plan view of the second planar member 110, and in which a second hole 113 corresponding to the imaging element 50 is formed. The second planar member 110 further includes a fifth wall portion 112a extending toward the first surface 40a of the circuit board 40 correspondingly to the ninth side 111a of the second planar portion, a sixth wall portion 112b extending toward the first surface 40a of the circuit board 40 correspondingly to the tenth side 111b of the second planar portion, a seventh wall portion 112c extending toward the first surface 40a of the circuit board 40 correspondingly to the eleventh side 111c of the second planar portion, and an eighth wall portion 112d extending toward the first surface 40a of the circuit board 40 correspondingly to the twelfth side 111d of the second planar portion. The second planar portion 111 of the second planar member 110 has the second hole 113, but may cover at least a part of the plurality of electronic components 45 and the imaging element 50 except for the second hole 113.

Accordingly, the shielding of the first surface 40a of the circuit board 40 can be secured, and the vehicular camera 100 can be easily manufactured using the second planar member 110 having a common shape such as a box shape.

In the present embodiment, an area of the second planar portion 111 of the second planar member 110 is set to be smaller than an area of the first planar portion 71 of the first planar member 70 and an area of the first surface 40a of the circuit board 40. Accordingly, the second planar member 110 can cover only a portion that is unavoidable for shielding.

As shown in FIG. 12, the first wall portion 72a of the first planar member 70 can be fixed to the second surface 40b of the circuit board 40 by a first clip 74a, the second wall portion 72b of the first planar member 70 can be fixed to the second surface 40b of the circuit board 40 by a second clip 74b, the third wall portion 72c of the first planar member 70 can be fixed to the second surface 40b of the circuit board 40 by a third clip 74c, and the fourth wall portion 72d of the first planar member 70 can be fixed to the second surface 40b of the circuit board 40 by a fourth clip 74d.

As shown in FIG. 12, the fifth wall portion 112a of the second planar member 110 can be fixed to the first surface 40a of the circuit board 40 by a fifth clip 114a, the sixth wall portion 112b of the second planar member 110 can be fixed to the first surface 40a of the circuit board 40 by a sixth clip 114b, the seventh wall portion 112c of the second planar member 110 can be fixed to the first surface 40a of the circuit board 40 by a seventh clip 114c, and the eighth wall portion 112d of the second planar member 110 can be fixed to the first surface 40a of the circuit board 40 by an eighth clip 114d.

Accordingly, the first planar member 70 and the second planar member 110 can be easily fixed to the circuit board 40. Here, the clip is a type of fastener.

Figure 16:
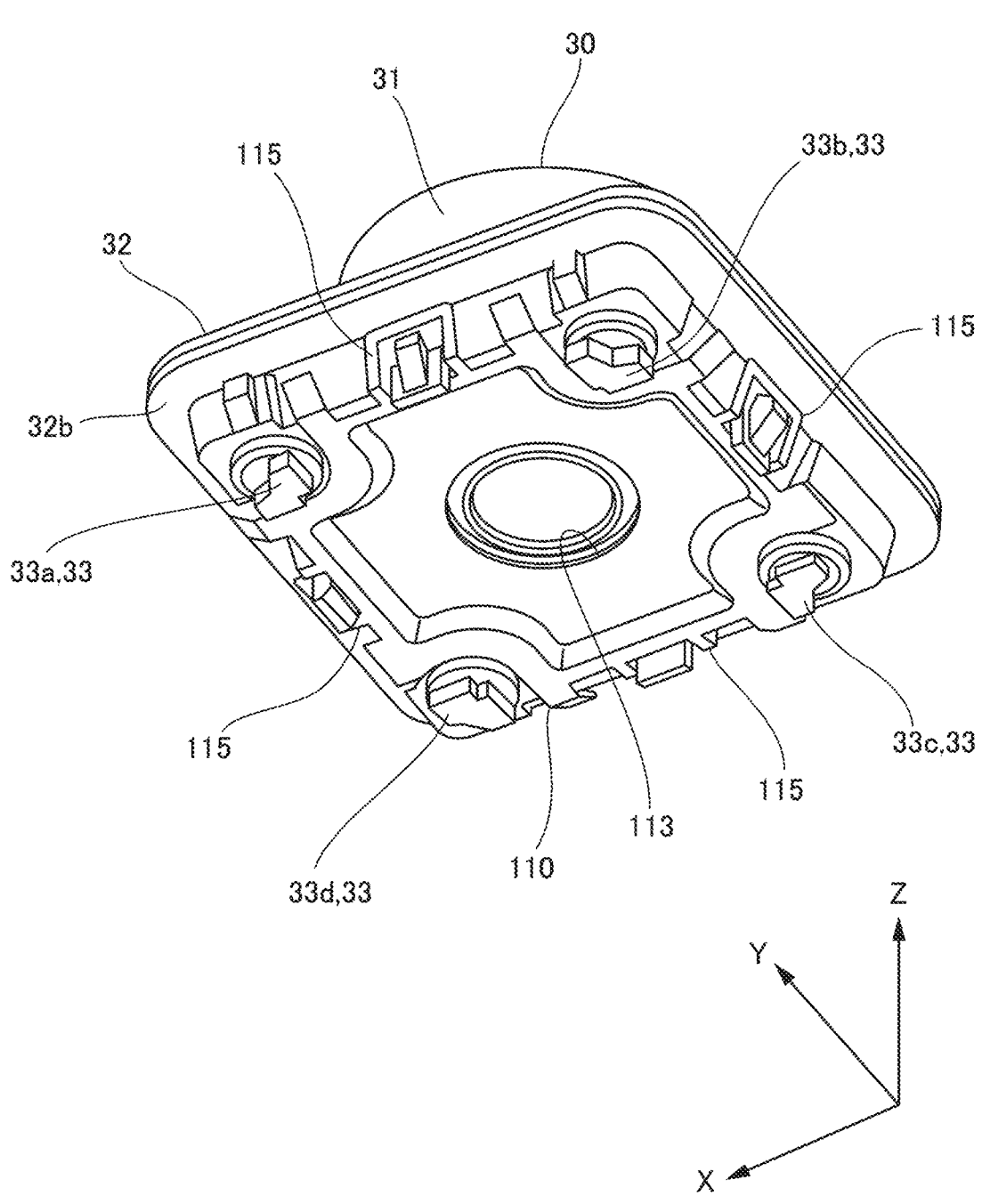
FIG. 16 is a perspective view of a lens unit of another embodiment as viewed from below.

FIG. 16 is a perspective view of the lens unit 30 of another embodiment as viewed from below. In this embodiment, unlike FIGS. 14 and 15, the second planar member 110 is attached to the lens unit 30. The second planar member 110 is attached to the flange portion 32 of the lens unit 30 by, for example, an attachment spring 115.

From the above, at least the following matters are described in the present disclosure. Components corresponding to those in the embodiment are shown in parentheses, but the present disclosure is not limited thereto.

(1) A vehicular camera (vehicular camera 100) including:
a lens unit (lens unit 30) including a first tubular portion (first tubular portion 31) having a first tubular shape and at least one lens disposed inside the first tubular portion and on an optical axis;
a circuit board (circuit board 40) including a first surface (first surface 40a) and a second surface (second surface 40b) opposite to the first surface;
an imaging element (imaging element 50) disposed on the optical axis and on the first surface of the circuit board;
a plurality of electronic components (electronic components 45) disposed on the first surface of the circuit board and the second surface of the circuit board;
a circuit board connector connection portion (circuit board connector connection portion 47) disposed on the second surface of the circuit board and electrically connected to a circuit of the circuit board;

a housing (housing 60) including a second tubular portion (second tubular portion 61) that accommodates at least the circuit board and the imaging element and has a second tubular shape along the optical axis, a first end portion (first end portion 63) disposed between the first tubular portion of the lens unit and the circuit board in a direction along the optical axis, and a second end portion (second end portion 64) opposite to the first end portion in the direction along the optical axis;

a metallic first planar member (first planar member 70) that is disposed between the first end portion of the housing and the second end portion of the housing, covers at least a part of the plurality of electronic components disposed on the second surface of the circuit board, and is electrically connected to the circuit of the circuit board;

a connector (connector 80) including at least one terminal (terminal 80*a*) that is disposed in the second end portion of the housing and extends across an inside and an outside of the housing in the direction along the optical axis; and a metallic tubular member (tubular member 90) that is disposed at the second end portion of the housing, extends across the inside and outside of the housing in the direction along the optical axis, surrounds at least a part of the at least one terminal of the connector around the direction along the optical axis, and has a tubular shape, in which the first planar member includes a first planar portion (first planar portion 71) that is disposed to face the second surface of the circuit board, has a first shape in a plan view of the first planar member, and includes a first hole (first hole 73) disposed to include a central portion of the first shape, and at least one wall portion (wall portion 72) extending from an end portion of the first shape of the first planar portion toward the lens unit, the tubular member is electrically connected to the first planar member in a state in which at least a part of an outer surface of the tubular member is held by the central portion including the first hole of the first shape of the first planar portion of the first planar member, the at least one terminal of the connector penetrates the first hole including the central portion of the first shape of the first planar portion of the first planar member, the connector includes a first end portion (first end portion 81) disposed inside the housing in the direction along the optical axis, and a second end portion (second end portion 82) that is opposite to the first end portion and disposed outside the housing in the direction along the optical axis, an end portion of the circuit board connector connection portion has a spherical concave portion, the first end portion of the at least one terminal of the connector has a spherical convex portion, and the convex portion of the first end portion of the at least one terminal of the connector is electrically connected to the concave portion of the end portion of the circuit board connector connection portion.

Accordingly, the circuit board connector connection portion and the terminal of the connector can be electrically connected with a simple configuration, and manufacturing cost of the vehicular camera can be reduced. In addition, the first planar member and the tubular member can efficiently shield noise from the plurality of electronic components and the connector.

(2) The vehicular camera according to (1), in which the tubular member includes a first end portion (first end portion 91) disposed inside the housing in the direction along the optical axis, and a second end portion (second end portion 92) that is opposite to the first end portion and disposed outside the housing in the direction along the optical axis, and in the direction along the optical axis, a first distance between the first end portion of the tubular member and the second surface of the circuit board is larger than a second distance between the first end portion of the at least one terminal of the connector and the second surface of the circuit board.

Accordingly, it is possible to prevent the first end portion of the tubular member from coming into contact with the circuit board and causing conduction between the tubular member and the circuit board, and ensure connection between the circuit board connector connection portion and the terminal of the connector without the tubular member becoming an obstacle.

(3) The vehicular camera according to (2), in which in the direction along the optical axis, the first distance between the first end portion of the tubular member and the second surface of the circuit board is smaller than a third distance between the first planar portion of the first planar member and the second surface of the circuit board.

Accordingly, since the first planar member covers the first end portion of the tubular member, shielding can be more reliably secured.

(4) The vehicular camera according to (3), in which the first end portion of the tubular member is not connected to the circuit board connector connection portion.

Accordingly, it is possible to prevent the conduction between the tubular member and the circuit board.

(5) The vehicular camera according to (4), in which there is a space between the first planar portion of the first planar member and the second end portion of the housing, and there is a space between the at least one wall portion of the first planar member and the second tubular portion of the housing.

Accordingly, the first planar member can be easily disposed inside the housing.

(6) The vehicular camera according to (1), in which a plurality of cuts (cuts 73*a*) are formed along an entire circumference of the central portion including the first hole of the first shape of the first planar portion of the first planar member.

Accordingly, the outer surface of the tubular member can be easily attached to the first hole of the first planar member.

(7) The vehicular camera according to (6), in which the tubular member is electrically connected to the first planar member in a state in which the at least a part of the outer surface of the tubular member is held by biasing force of a plurality of elastic pieces (elastic pieces 73*b*) defined by the plurality of cuts in the central portion including the first hole of the first planar portion of the first planar member.

Accordingly, the plurality of elastic pieces 73*b* can hold the outer surface of the tubular member in the first hole of the first planar member, and can ensure conduction between the first planar member and the tubular member.

(8) The vehicular camera according to (1), in which the at least one terminal of the connector is a metallic pin.

Accordingly, the configuration of the connector can be simplified, and the cost can be reduced.

(9) The vehicular camera according to (8), in which when the vehicular camera is disposed in a vehicle, the second end portion of the at least one terminal of the connector is electrically connected to a cable of the vehicle.

Accordingly, an electric signal can be transmitted to and from the vehicle.

(10) The vehicular camera according to (1), in which the housing includes a third tubular portion (small-diameter tubular portion 62) that is formed continuously with the second end portion of the housing, protrudes in a direction away from the circuit board in the direction along the optical axis, and has a diameter smaller than a diameter of the second tubular portion of the housing, and the second end portion of the tubular member is disposed inside the third tubular portion of the housing.

Accordingly, the tubular member can be stably disposed in the third tubular portion having a small diameter.

(11) The vehicular camera according to (10), in which the connector is integrated with the tubular member, and the connector and the tubular member are integrally formed with the second end portion and the third tubular portion of the housing.

Accordingly, it is possible to easily assemble the connector, the tubular member, and the housing.

(12) The vehicular camera according to (1), further including:

a flat ring member (ring member 20) formed of a first resin having predetermined light transmittance and including a first surface (first surface 20*a*) and a second surface (second surface 20*b*) opposite to the first surface, in which the lens unit includes a flange portion (flange portion 32) disposed outside the first tubular portion to extend outward with reference to the optical axis over an entire circumference centering on the optical axis, the flange portion of the lens unit includes a first flange surface (first flange surface 32*a*) facing at least a part of the second surface of the ring member, and a second flange surface (second flange surface 32*b*) that is opposite to the first flange surface, faces at least a part of the first surface of the circuit board, and is formed of a second resin having a first light absorptivity, and is disposed more inward than the second tubular portion of the housing in a radial direction orthogonal to the optical axis, an end surface (end surface 63*a*) of the first end portion of the housing is formed of a third resin having a second light absorptivity, and the ring member protrudes outward in the radial direction from the first end portion of the housing over the entire circumference centering on the optical axis, and is welded to the first flange surface of the flange portion of the lens unit and the end surface of the first end portion of the housing.

Accordingly, after first laser welding of the ring member and the lens unit, the ring member is placed on the first end portion of the housing, and second laser welding of the ring member and the housing is performed. Here, the ring member protrudes outward in the radial direction from the first end portion of the housing over the entire circumference, and thus in the second laser welding, the ring member and the lens unit, which are welded to each other, can be accurately aligned while being shifted along the XY plane. Thus, the assembly with high accuracy can be performed.

(13) The vehicular camera according to (12), in which a protruding length of the ring member protruding outward in the radial direction from the first end portion of the housing varies according to a position around an entire circumference of the ring member.

Accordingly, the second laser welding can be performed while the lens unit and the ring member, which are welded to each other, are moved to a suitable position with respect to the housing, and the assembly with high accuracy can be performed.

(14) The vehicular camera according to (13), in which a cross section along the radial direction of the flange portion of the lens unit has a first quadrilateral shape, a cross section along the radial direction of the ring member has a second quadrilateral shape, a cross section along the radial direction of the second tubular portion of the housing has a third quadrilateral shape, the ring member includes at least a first side (first side 21), a second side (second side 22), a third side (third side 23), and a fourth side (fourth side 24), and a first protruding length of the first side of the ring member protruding outward in the radial direction from the first end portion of the housing is different from a second protruding length of the second side of the ring member protruding outward in the radial direction from the first end portion of the housing.

Accordingly, the vehicular camera can be easily manufactured using a member having a common shape. In addition, the second laser welding can be performed after the lens unit and the ring member, which are welded to each other, are moved to a suitable position with respect to the housing, and the assembly with high accuracy can be performed.

(15) The vehicular camera according to (12), in which the lens unit includes at least four protrusions (protrusions 33) protruding from the second flange surface of the flange portion toward the first surface of the circuit board, the at least four protrusions include a first protrusion (first protrusion 33*a*), a second protrusion (second protrusion 33*b*), a third protrusion (third protrusion 33*c*), and a fourth protrusion (fourth protrusion 33*d*), the first protrusion of the lens unit is fixed to the first surface of the circuit board via a first adhesive (first adhesive 34*a*), the second protrusion of the lens unit is fixed to the first surface of the circuit board via a second adhesive (second adhesive 34*b*), the third protrusion of the lens unit is fixed to the first surface of the circuit board via a third adhesive (third adhesive 34*c*), and the fourth protrusion of the lens unit is fixed to the first surface of the circuit board via a fourth adhesive (fourth adhesive 34*d*).

Accordingly, the circuit board can be fixed to the lens unit by the four protrusions, and the circuit board can be stably disposed inside the housing. In addition, the ring member is welded to the second flange surface of the flange portion by the first laser welding, and at the time of the second laser welding of the ring member and the housing, the circuit board is also moved along the XY plane together with the ring member and the lens unit to perform alignment, and then the second laser welding can be performed. Thus, the assembly with high accuracy can be performed.

(16) The vehicular camera according to (1), in which the first hole including the central portion of the first planar portion of the first planar member has a circular shape, and the tubular member has a tubular shape.

Accordingly, the vehicular camera can be easily manufactured using a member having a common shape.

(17) The vehicular camera according to (1), in which the first planar member includes at least a fifth side (fifth side 71a), a sixth side (sixth side 71b), a seventh side (seventh side 71c), and an eighth side (eighth side 71d) in a plan view of the first planar portion, and includes a first wall portion (first wall portion 72a) extending toward the second surface of the circuit board correspondingly to the fifth side of the first planar portion, a second wall portion (second wall portion 72b) extending toward the second surface of the circuit board correspondingly to the sixth side of the first planar portion, a third wall portion (third wall portion 72c) extending toward the second surface of the circuit board correspondingly to the seventh side of the first planar portion, and a fourth wall portion (fourth wall portion 72d) extending toward the second surface of the circuit board correspondingly to the eighth side of the first planar portion.

Accordingly, the vehicular camera can be easily manufactured using the first planar member having a common shape such as a box shape.

(18) The vehicular camera according to (17), further including:

a metallic second planar member (second planar member 110) that is disposed on the first surface of the circuit board and is disposed to cover at least a part of the plurality of electronic components disposed on the first surface of the circuit board and the imaging element, in which the second planar member includes a second planar portion (second planar portion 111) having a second shape having at least a ninth side (ninth side 111a), a tenth side (tenth side 111b), an eleventh side (eleventh side 111c), and a twelfth side (twelfth side 111d) in a plan view of the second planar member, and in which a second hole (second hole 113) corresponding to the imaging element is formed, a fifth wall portion (fifth wall portion 112a) extending toward the first surface of the circuit board correspondingly to the ninth side of the second planar portion, a sixth wall portion (sixth wall portion 112b) extending toward the first surface of the circuit board correspondingly to the tenth side of the second planar portion, a seventh wall portion (seventh wall portion 112c) extending toward the first surface of the circuit board correspondingly to the eleventh side of the second planar portion, and an eighth wall portion (eighth wall portion 112d) extending toward the first surface of the circuit board correspondingly to the twelfth side of the second planar portion.

Accordingly, the shielding of the first surface of the circuit board can be secured, and the vehicular camera can be easily manufactured using the second planar member having a common shape such as a box shape.

(19) The vehicular camera according to (18), in which an area of the second planar portion of the second planar member is smaller than an area of the first planar portion of the first planar member and an area of the first surface of the circuit board.

Accordingly, the second planar member can cover only a portion that is unavoidable for shielding.

(20) The vehicular camera according to (19), in which the first wall portion of the first planar member is fixed to the second surface of the circuit board by a first clip (first clip 74a), the second wall portion of the first planar member is fixed to the second surface of the circuit board by a second clip (second clip 74b), the third wall portion of the first planar member is fixed to the second surface of the circuit board by a third clip (third clip 74c), the fourth wall portion of the first planar member is fixed to the second surface of the circuit board by a fourth clip (fourth clip 74d), the fifth wall portion of the second planar member is fixed to the first surface of the circuit board by a fifth clip (fifth clip 114a), the sixth wall portion of the second planar member is fixed to the first surface of the circuit board by a sixth clip (sixth clip 114b), the seventh wall portion of the second planar member is fixed to the first surface of the circuit board by a seventh clip (seventh clip 114c), and the eighth wall portion of the second planar member is fixed to the first surface of the circuit board by an eighth clip (eighth clip 114d).

Accordingly, the first planar member and the second planar member can be easily fixed to the circuit board.

Although the embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, constituent elements in the embodiment described above may be freely combined without departing from the gist of the invention.

INDUSTRIAL APPLICABILITY

The present disclosure is useful as a vehicular camera capable of exhibiting excellent shielding performance.

CROSS-REFERENCE TO RELATED
APPLICATIONS

This application is based on and claims priority under 35 USC 119 from Japanese Patent Application No. 2023-215057 filed on Dec. 20, 2023, the contents of which are incorporated herein by reference.

What is claimed is:

1. A vehicular camera comprising:

a lens unit including a first tubular portion having a first tubular shape and at least one lens disposed inside the first tubular portion and on an optical axis;

a circuit board including a first surface and a second surface opposite to the first surface;

an imaging element disposed on the optical axis and on the first surface of the circuit board;

a plurality of electronic components disposed on the first surface of the circuit board and the second surface of the circuit board;

a circuit board connector connection portion disposed on the second surface of the circuit board and electrically connected to a circuit of the circuit board;

a housing including a second tubular portion that accommodates at least the circuit board and the imaging element and has a second tubular shape along the optical axis, a first end portion disposed between the first tubular portion of the lens unit and the circuit board in a direction along the optical axis, and a second end portion opposite to the first end portion in the direction along the optical axis;

a metallic first planar member that is disposed between the first end portion of the housing and the second end portion of the housing, covers at least a part of the plurality of electronic components disposed on the second surface of the circuit board, and is electrically connected to the circuit of the circuit board;

a connector including at least one terminal that is disposed in the second end portion of the housing and extends across an inside and an outside of the housing in the direction along the optical axis; and a metallic tubular member that is disposed at the second end portion of the housing, extends across the inside and outside of the housing in the direction along the optical axis, surrounds at least a part of the at least one terminal of the connector around the direction along the optical axis, and has a tubular shape, wherein the first planar member includes a first planar portion that is disposed to face the second surface of the circuit board, has a first shape in a plan view of the first planar member, and includes a first hole disposed to include a central portion of the first shape, and at least one wall portion extending from an end portion of the first shape of the first planar portion toward the lens unit, the tubular member is electrically connected to the first planar member in a state in which at least a part of an outer surface of the tubular member is held by the central portion including the first hole of the first shape of the first planar portion of the first planar member, the at least one terminal of the connector penetrates the first hole including the central portion of the first shape of the first planar portion of the first planar member, the connector includes a first end portion disposed inside the housing in the direction along the optical axis, and a second end portion that is opposite to the first end portion and disposed outside the housing in the direction along the optical axis, an end portion of the circuit board connector connection portion has a spherical concave portion, the first end portion of the at least one terminal of the connector has a spherical convex portion, and the convex portion of the first end portion of the at least one terminal of the connector is electrically connected to the concave portion of the end portion of the circuit board connector connection portion.

2. The vehicular camera according to claim 1, wherein the tubular member includes a first end portion disposed inside the housing in the direction along the optical axis, and a second end portion that is opposite to the first end portion and disposed outside the housing in the direction along the optical axis, and in the direction along the optical axis, a first distance between the first end portion of the tubular member and the second surface of the circuit board is larger than a second distance between the first end portion of the at least one terminal of the connector and the second surface of the circuit board.

3. The vehicular camera according to claim 2, wherein in the direction along the optical axis, the first distance between the first end portion of the tubular member and the second surface of the circuit board is smaller than a third distance between the first planar portion of the first planar member and the second surface of the circuit board.

4. The vehicular camera according to claim 3, wherein the first end portion of the tubular member is not connected to the circuit board connector connection portion.

5. The vehicular camera according to claim 4, wherein a space is provided between the first planar portion of the first planar member and the second end portion of the housing, and a space is provided between the at least one wall portion of the first planar member and the second tubular portion of the housing.

6. The vehicular camera according to claim 1, wherein a plurality of cuts are formed along an entire circumference of the central portion including the first hole of the first shape of the first planar portion in the first planar member.

7. The vehicular camera according to claim 6, wherein the tubular member is electrically connected to the first planar member in a state in which the at least a part of the outer surface of the tubular member is held by biasing force of a plurality of elastic pieces defined by the plurality of cuts in the central portion including the first hole of the first planar portion of the first planar member.

8. The vehicular camera according to claim 1, wherein the at least one terminal of the connector is a metallic pin.

9. The vehicular camera according to claim 8, wherein when the vehicular camera is disposed in a vehicle, the second end portion of the at least one terminal of the connector is electrically connected to a cable of the vehicle.

10. The vehicular camera according to claim 1, wherein the housing includes a third tubular portion that is formed continuously with the second end portion of the housing, protrudes in a direction away from the circuit board in the direction along the optical axis, and has a diameter smaller than a diameter of the second tubular portion of the housing, and the second end portion of the tubular member is disposed inside the third tubular portion of the housing.

11. The vehicular camera according to claim 10, wherein the connector is integrated with the tubular member, and the connector and the tubular member are integrally formed with the second end portion and the third tubular portion of the housing.

12. The vehicular camera according to claim 1, further comprising:

a flat ring member formed of a first resin having predetermined light transmittance and including a first surface and a second surface opposite to the first surface, wherein the lens unit includes a flange portion disposed outside the first tubular portion to extend outward with reference to the optical axis over an entire circumference centering on the optical axis, the flange portion of the lens unit includes
    a first flange surface facing at least a part of the second surface of the ring member, and
    a second flange surface that is opposite to the first flange surface, faces at least a part of the first surface of the circuit board, and is formed of a second resin having a first light absorptivity, the flange portion of the lens unit is disposed more inward than the second tubular portion of the housing in a radial direction orthogonal to the optical axis, an end surface of the first end portion of the housing is formed of a third resin having a second light absorptivity, and the ring member protrudes outward in the radial direction from the first end portion of the housing over the entire circumference centering on the optical axis, and is welded to the first flange surface of the flange portion of the lens unit and the end surface of the first end portion of the housing.

13. The vehicular camera according to claim 12, wherein a protruding length of the ring member protruding outward in the radial direction from the first end portion of the housing varies according to a position around an entire circumference of the ring member.

14. The vehicular camera according to claim 13, wherein a cross section along the radial direction of the flange portion of the lens unit has a first quadrilateral shape,
a cross section along the radial direction of the ring member has a second quadrilateral shape,
a cross section along the radial direction of the second tubular portion of the housing has a third quadrilateral shape,
the ring member includes at least a first side, a second side, a third side, and a fourth side, and
a first protruding length of the first side of the ring member protruding outward in the radial direction from the first end portion of the housing is different from a second protruding length of the second side of the ring member protruding outward in the radial direction from the first end portion of the housing.

15. The vehicular camera according to claim 12, wherein the lens unit includes at least four protrusions protruding from the second flange surface of the flange portion toward the first surface of the circuit board,
the at least four protrusions include a first protrusion, a second protrusion, a third protrusion, and a fourth protrusion,
the first protrusion of the lens unit is fixed to the first surface of the circuit board via a first adhesive,
the second protrusion of the lens unit is fixed to the first surface of the circuit board via a second adhesive,
the third protrusion of the lens unit is fixed to the first surface of the circuit board via a third adhesive, and
the fourth protrusion of the lens unit is fixed to the first surface of the circuit board via a fourth adhesive.

16. The vehicular camera according to claim 1, wherein the first hole including the central portion of the first planar portion of the first planar member has a circular shape, and
the tubular member has a tubular shape.

17. The vehicular camera according to claim 1, wherein the first planar member includes at least a fifth side, a sixth side, a seventh side, and an eighth side in a plan view of the first planar portion, and includes
    a first wall portion extending toward the second surface of the circuit board correspondingly to the fifth side of the first planar portion,
    a second wall portion extending toward the second surface of the circuit board correspondingly to the sixth side of the first planar portion,
    a third wall portion extending toward the second surface of the circuit board correspondingly to the seventh side of the first planar portion, and
    a fourth wall portion extending toward the second surface of the circuit board correspondingly to the eighth side of the first planar portion.

18. The vehicular camera according to claim 17, further comprising:
a metallic second planar member that is disposed on the first surface of the circuit board and is disposed to cover at least a part of the plurality of electronic components disposed on the first surface of the circuit board and the imaging element, wherein
the second planar member includes
    a second planar portion having a second shape having at least a ninth side, a tenth side, an eleventh side, and a twelfth side in a plan view of the second planar member, and in which a second hole corresponding to the imaging element is formed,
    a fifth wall portion extending toward the first surface of the circuit board correspondingly to the ninth side of the second planar portion,
    a sixth wall portion extending toward the first surface of the circuit board correspondingly to the tenth side of the second planar portion,
    a seventh wall portion extending toward the first surface of the circuit board correspondingly to the eleventh side of the second planar portion, and
    an eighth wall portion extending toward the first surface of the circuit board correspondingly to the twelfth side of the second planar portion.

19. The vehicular camera according to claim 18, wherein an area of the second planar portion of the second planar member is smaller than an area of the first planar portion of the first planar member and an area of the first surface of the circuit board.

20. The vehicular camera according to claim 19, wherein the first wall portion of the first planar member is fixed to the second surface of the circuit board by a first clip,
the second wall portion of the first planar member is fixed to the second surface of the circuit board by a second clip,
the third wall portion of the first planar member is fixed to the second surface of the circuit board by a third clip,
the fourth wall portion of the first planar member is fixed to the second surface of the circuit board by a fourth clip,
the fifth wall portion of the second planar member is fixed to the first surface of the circuit board by a fifth clip,
the sixth wall portion of the second planar member is fixed to the first surface of the circuit board by a sixth clip,
the seventh wall portion of the second planar member is fixed to the first surface of the circuit board by a seventh clip, and the eighth wall portion of the second planar member is fixed to the first surface of the circuit board by an eighth clip.

\* \* \* \* \*